(12) United States Patent
    Xu et al.

(10) Patent No.: US 12,603,738 B2
(45) Date of Patent: Apr. 14, 2026

(54) PILOT DETERMINING METHOD AND APPARATUS

(71) Applicant: HUAWEI TECHNOLOGIES CO., LTD., Shenzhen (CN)

(72) Inventors: Jianbiao Xu, Shenzhen (CN); Gaoning He, Boulogne Billancourt (FR); Yong Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/489,259

(22) Filed: Oct. 18, 2023

(65) Prior Publication Data

US 2024/0048315 A1      Feb. 8, 2024

Related U.S. Application Data

(63) Continuation of application No. PCT/CN2022/077703, filed on Feb. 24, 2022.

(30) Foreign Application Priority Data

Apr. 23, 2021    (CN) .......................... 202110444282.4

(51) Int. Cl.
    *H04L 5/00*        (2006.01)
    *H04B 7/0413*      (2017.01)
(52) U.S. Cl.
    CPC ......... *H04L 5/0048* (2013.01); *H04B 7/0413* (2013.01)

(58) Field of Classification Search
    CPC ........................... H04B 7/0413; H04L 5/0048
    USPC ........................................................ 370/329
    See application file for complete search history.

(56) References Cited

U.S. PATENT DOCUMENTS

| | | | |
|---|---|---|---|
| 2017/0111201 A1 | 4/2017 | Sandell et al. | |
| 2023/0261704 A1* | 8/2023 | Meng ................... | H04B 17/309 370/329 |
| 2024/0048315 A1* | 2/2024 | Xu ......................... | H04L 5/0048 |

FOREIGN PATENT DOCUMENTS

| | | |
|---|---|---|
| CN | 105610561 A | 5/2016 |
| WO | 2017132984 A1 | 8/2017 |

OTHER PUBLICATIONS

Bjornson et al., "A Framework for Training-Based Estimation in Arbitrarily Correlated Rician MIMO Channels With Rician Disturbance", IEEE Transactions on Signal Processing, IEEE, Feb. 10, 2010, vol. 58, No. 3, 14 pages.

(Continued)

*Primary Examiner* — Peter G Solinsky
(74) *Attorney, Agent, or Firm* — Maier & Maier, PLLC

(57) ABSTRACT

A first terminal receives first information from a network device, and determines, based on the first information, a pilot used by the first terminal. The first terminal is a terminal in $N_U$ terminals, the first information is determined based on a joint matrix, the joint matrix includes transmit/receive full-dimensional statistical information of channels between the $N_U$ terminals and the network device, and the joint matrix is for determining pilots of the $N_U$ terminals.

20 Claims, 7 Drawing Sheets

(56)     References Cited

OTHER PUBLICATIONS

Shen et al., "Coordinated Nonorthogonal Pilot Design for Massive MIMO", arXiv: 1904.09653v1, Apr. 21, 2019, 11 pages.
3GPP TS 38.211, "3rd Generation Partnership Project; Technical Specification Group Radio Access Network; NR; Physical Channels and Modulation (Release 16)", 3GPP Organizational Partners, Mar. 2021, V16.5.0, 134 pages.

* cited by examiner

Network device

Terminal

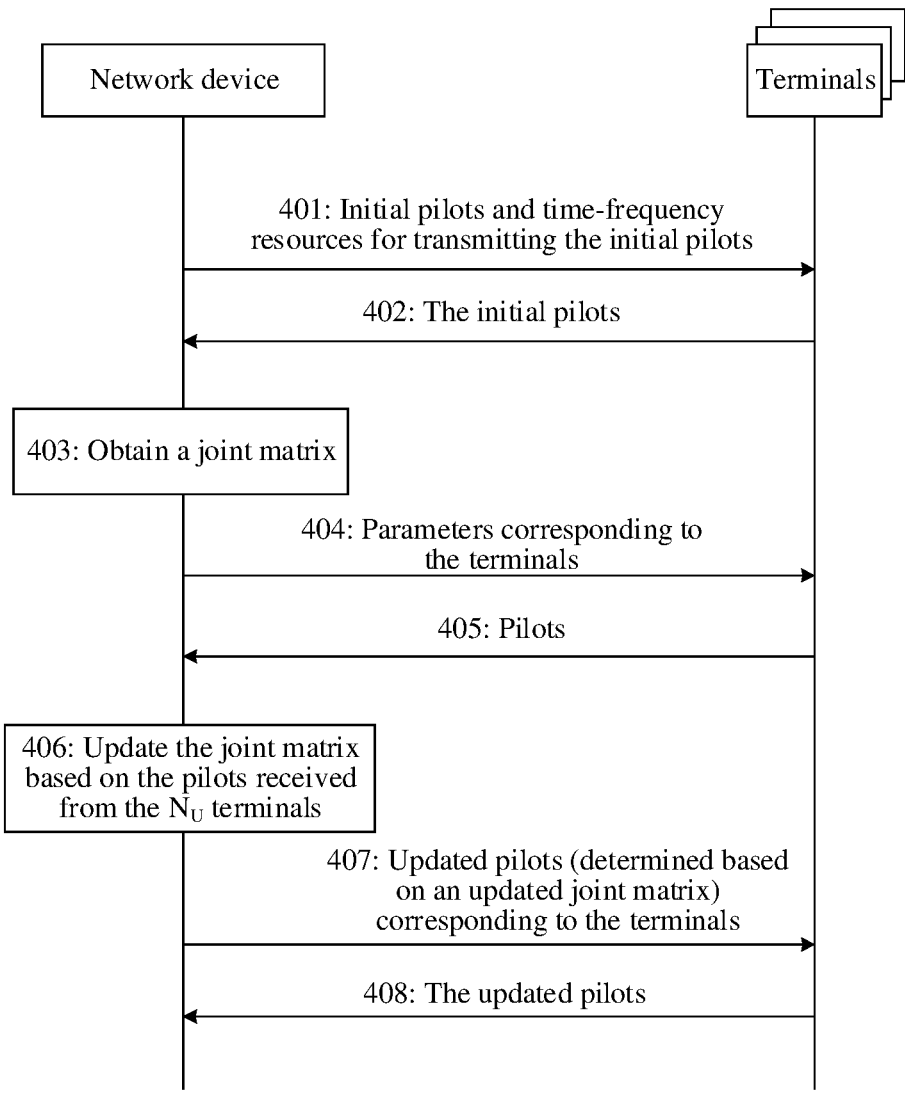

Network device

Terminals

401: Initial pilots and time-frequency
resources for transmitting the initial pilots 402: The initial pilots 403: Obtain a joint matrix 404: Parameters corresponding to
the terminals 405: Pilots 406: Update the joint matrix
based on the pilots received
from the $N_U$ terminals 407: Updated pilots (determined based
on an updated joint matrix)
corresponding to the terminals 408: The updated pilots

FIG. 4

PILOT DETERMINING METHOD AND APPARATUS

CROSS-REFERENCE TO RELATED APPLICATIONS

This application is a continuation of International Application No. PCT/CN2022/077703, filed on Feb. 24, 2022, which claims priority to Chinese Patent Application No. 202110444282.4, filed on Apr. 23, 2021. The disclosures of the aforementioned applications are hereby incorporated by reference in their entireties.

BACKGROUND

Massive-multiple-input multiple-output (MIMO) is an important means for improving system capacity and spectral efficiency of a wireless communication system. A basic principle of Massive-MIMO is as follows: A transmit end determines, based on channel state information (CSI), effective transmission space of a channel based on a method such as singular value decomposition (SVD), where there may be a plurality of orthogonal or nearly orthogonal parallel subchannels in the transmission space. A space division multiplexing gain of multiplied capacity is obtained by sending a plurality of independent data streams in the parallel subchannels. A key condition for obtaining the space division multiplexing gain based on the technology is that the transmit end can obtain CSI that is precise enough.

A typical method is as follows: A terminal sends a pilot, and a network device estimates uplink CSI based on the pilot, and then transposes the uplink CSI as downlink CSI based on uplink and downlink channel reciprocity. Because there may be a large quantity of terminals in Massive-MIMO, if each terminal transmits an orthogonal pilot, pilot overheads are large; and if each terminal transmits a non-orthogonal pilot, there is pilot interference between a plurality of terminals, and CSI estimation precision is affected. Therefore, a pilot problem has become the key bottleneck of Massive-MIMO, and a more effective solution is required.

SUMMARY

The embodiments provide a pilot determining method and an apparatus, to resolve a problem that pilot overheads and pilot interference between a plurality of terminals because a large quantity of terminals use pilots cannot be balanced.

According to a first aspect, a pilot determining method is provided. The method includes: A first terminal receives first information from a network device, and determines, based on the first information, a pilot used by the first terminal. The first information is determined based on a joint matrix, the joint matrix includes transmit/receive full-dimensional statistical information of channels between $N_U$ terminals and the network device, the joint matrix is for determining pilots of the $N_U$ terminals, the first terminal is a terminal in the $N_U$ terminals, and $N_U$ is an integer greater than 0. In the method provided in the first aspect, a multi-terminal channel statistical feature is introduced in a process of determining a pilot used by a terminal, and compared with directly allocating a pilot to a terminal (that is, not introducing the multi-terminal channel statistical feature) in conventional technologies, the determined pilot can better match the channel statistical feature, so that CSI estimation precision can be improved. As the CSI estimation precision is improved, fewer pilots can be used by the terminal to achieve same CSI estimation precision. Therefore, pilot overheads can also be reduced.

In a possible implementation, the first information is a pilot corresponding to the first terminal in a first matrix, and the first matrix includes the pilots of the $N_U$ terminals. In the possible implementation, the first terminal may be notified of the corresponding pilot, so that the first terminal obtains the pilot that needs to be used.

In a possible implementation, the first information is a parameter obtained by transforming and compressing a pilot corresponding to the first terminal in a first matrix, and the first matrix includes the pilots of the $N_U$ terminals; and that the first terminal determines, based on the first information, a pilot used by the first terminal includes: The first terminal obtains, based on the first information, the pilot corresponding to the first terminal in the first matrix through restoration. In the possible implementation, the network device indicates, to the terminal, the parameter obtained by transforming and compressing the pilot, instead of the pilot, so that signaling overheads for indicating the pilot by the network device to the terminal can be reduced, thereby achieving a compromise between performance and overheads.

In a possible implementation, the first information includes second information and an index of the first terminal, the second information is for determining the joint matrix, and the index of the first terminal is for determining the pilot used by the first terminal; and that the first terminal determines, based on the first information, a pilot used by the first terminal includes: The first terminal determines, based on the second information, the joint matrix; determines a first matrix based on the joint matrix; and determines, based on the index of the first terminal, the pilot used by the first terminal from the first matrix. The first matrix includes the pilots of the Nu terminals. In the possible implementation, the network device does not need to indicate the pilot to the terminal, and the first terminal determines the pilot based on the first information.

In a possible implementation, the second information is for indicating the transmit/receive full-dimensional statistical information corresponding to the $N_U$ terminals in the joint matrix; or the second information is for indicating Q transmit/receive angle spectral coefficients determined based on the joint matrix and indexes corresponding to the Q transmit/receive angle spectral coefficients; or the second information is for indicating $N_U$*P transmit/receive angle spectral coefficients determined based on the transmit/receive full-dimensional statistical information corresponding to the $N_U$ terminals and indexes corresponding to the $N_U$*P transmit/receive angle spectral coefficients, where each terminal in the $N_U$ terminals corresponds to P transmit/receive angle spectral coefficients and P indexes, and P indexes corresponding to the first terminal are indexes corresponding to P transmit/receive angle spectral coefficients corresponding to the first terminal, where both Q and P are integers greater than 0. In the possible implementation, in a case that the second information is the transmit/receive angle spectral coefficients and the indexes corresponding to the transmit/receive angle spectral coefficients, the first terminal may reconstruct the joint matrix based on the transmit/receive angle spectral coefficients and the indexes corresponding to the transmit/receive angle spectral coefficients. In this way, compared with directly sending, to the first terminal, the transmit/receive full-dimensional statistical information corresponding to the $N_U$ terminals in the joint matrix, signaling overheads can be reduced.

In a possible implementation, if a second terminal in the $N_U$ terminals does not need to send a pilot to the network device, the method further includes: The first terminal receives an index of the second terminal from the network device; the first terminal deletes, based on the index of the second terminal, an element corresponding to the second terminal from the joint matrix, to obtain an updated joint matrix; and the first terminal updates the first matrix based on the updated joint matrix. In the possible implementation, the network device may indicate an index of a to-be-deleted terminal through signaling, and the first terminal may update the joint matrix based on the index of the to-be-deleted terminal, to update a used pilot. In this way, compared with indicating other information for determining the updated joint matrix, signaling overheads can be reduced.

In a possible implementation, if a third terminal other than the $N_U$ terminals needs to send a pilot to the network device, the method further includes: The first terminal receives transmit/receive full-dimensional statistical information corresponding to the third terminal from the network device; the first terminal adds the transmit/receive full-dimensional statistical information corresponding to the third terminal to the joint matrix, to obtain an updated joint matrix; and the first terminal updates the first matrix based on the updated joint matrix. In the possible implementation, the network device may indicate transmit/receive full-dimensional statistical information corresponding to a newly added terminal through signaling, and the first terminal may update the joint matrix based on the transmit/receive full-dimensional statistical information corresponding to the newly added terminal, to update a used pilot. In this way, compared with indicating information about an entire updated joint matrix by the network device to the first terminal, signaling overheads can be reduced.

In a possible implementation, that the first terminal determines a first matrix based on the joint matrix includes: The first terminal obtains a second matrix based on the joint matrix, where the second matrix includes transmit end components of the joint matrix; and the first terminal determines the first matrix based on the second matrix.

In a possible implementation, that the first terminal determines the first matrix based on the second matrix includes: The first terminal obtains a third matrix based on the second matrix, where the third matrix includes direction information of the transmit end components of the joint matrix; and the first terminal determines the first matrix based on the third matrix.

In a possible implementation, that the first terminal determines the first matrix based on the third matrix includes: The first terminal determines that a matrix formed by eigenvectors of $N_P$ largest eigenvalues corresponding to the third matrix is the first matrix; or the first terminal determines that a matrix obtained by performing terminal-level power normalization on a matrix formed by eigenvectors of $N_P$ largest eigenvalues corresponding to the third matrix is the first matrix, where $N_P$ is a quantity of resources for transmitting the pilots, and $N_P$ is an integer greater than 1. In the possible implementation, if the first terminal determines that the matrix obtained by performing terminal-level power normalization on the matrix formed by the eigenvectors of $N_P$ largest eigenvalues corresponding to the third matrix is the first matrix, transmit power of base bands of different terminals is limited by power normalization, and the transmit power of the base bands of the different terminals is the same or similar, so that power is properly allocated to the terminal, and the determined pilot can more adapt to a channel.

In a possible implementation, that the first terminal determines the first matrix based on the second matrix includes: The first terminal obtains a third matrix based on the second matrix, where the third matrix includes direction information of the transmit end components of the joint matrix; the first terminal obtains a fourth matrix based on the second matrix, where the fourth matrix includes size information of the transmit end components of the joint matrix; the first terminal determines a fifth matrix based on the fourth matrix and a quantity of resources for transmitting the pilots, where the fifth matrix is used for power allocation of a transmit end component in each direction in the third matrix; and the first terminal determines the first matrix based on the third matrix and the fifth matrix. In the possible implementation, compared with the foregoing possible implementation, pilot estimation precision can be further improved.

In a possible implementation, that the first terminal determines the first matrix based on the third matrix and the fifth matrix includes: The first terminal multiplies the third matrix and the fifth matrix to obtain the first matrix; or the first terminal determines that a matrix obtained by multiplying the third matrix and the fifth matrix and performing terminal-level power normalization is the first matrix. In the possible implementation, if the first terminal determines that the matrix obtained by multiplying the third matrix and the fifth matrix and performing terminal-level power normalization is the first matrix, transmit power of base bands of different terminals is limited by power normalization, and the transmit power of the base bands of the different terminals is the same or similar, so that power is properly allocated to the terminal, and the determined pilot can more adapt to a channel.

In a possible implementation, that the first terminal determines a first matrix based on the joint matrix includes: The first terminal obtains an initial first matrix based on the joint matrix; and the first terminal uses the initial first matrix as an initial solution, and obtains the first matrix based on an iteration method; or the first terminal uses the initial first matrix as an initial solution, obtains a sixth matrix based on an iteration method, and determines that a matrix obtained by performing terminal-level power normalization on the sixth matrix is the first matrix. In the possible implementation, if the joint matrix is approximately decomposed into the third matrix and the fourth matrix, an error may be eliminated based on the iteration method, to approximate to an optimal solution, and obtain a more precise first matrix.

In a possible implementation, the joint matrix is obtained by performing block-diagonal concatenation on $N_U$ pieces of transmit/receive full-dimensional statistical information, an $n_u^{th}$ piece of transmit/receive full-dimensional statistical information in the $N_U$ pieces of transmit/receive full-dimensional statistical information is transmit/receive full-dimensional statistical information of a channel between an $n_u^{th}$ terminal in the $N_U$ terminals and the network device, and $n_u$ is an integer greater than 0 and less than or equal to $N_U$. In the possible implementation, block-diagonal concatenation is performed on the $N_U$ pieces of transmit/receive full-dimensional statistical information to obtain the joint matrix, so that the joint matrix has a multi-terminal channel statistical feature, and the pilot determined based on the joint matrix can more adapt to a channel.

In a possible implementation, the $N_U$ pieces of transmit/receive full-dimensional statistical information may be determined based on channel matrices of the $N_U$ terminals.

According to a second aspect, a pilot determining method is provided. The method includes: A network device obtains a joint matrix, where the joint matrix includes transmit/receive full-dimensional statistical information of channels between $N_U$ terminals and the network device, the joint matrix is for determining pilots of the $N_U$ terminals, and $N_U$ is an integer greater than 0; and the network device sends first information to a first terminal, where the first information is for determining a pilot used by the first terminal, the first information is determined based on the joint matrix, and the first terminal is a terminal in the $N_U$ terminals. In the method provided in the second aspect, a multi-terminal channel statistical feature is introduced in a process of determining a pilot used by a terminal, and compared with directly allocating a pilot to a terminal (that is, not introducing the multi-terminal channel statistical feature) in conventional technologies, the determined pilot can better match the channel statistical feature, so that CSI estimation precision can be improved. As the CSI estimation precision is improved, fewer pilots can be used by the terminal to achieve same CSI estimation precision. Therefore, pilot overheads can also be reduced.

In a possible implementation, the method further includes: The network device obtains a first matrix based on the joint matrix, where the first matrix includes the pilots of the $N_U$ terminals; and the network device determines the first information, where the first information is determined based on a pilot corresponding to the first terminal in the first matrix.

In a possible implementation, the first information is a pilot corresponding to the first terminal in the first matrix, or the first information is a parameter obtained by transforming and compressing a pilot corresponding to the first terminal in the first matrix. In the possible implementation, in a case that the first information is the parameter obtained by transforming and compressing the pilot corresponding to the first terminal in the first matrix, the network device indicates, to the terminal, the parameter obtained by transforming and compressing the pilot, instead of the pilot, so that signaling overheads for indicating the pilot by the network device to the terminal can be reduced, thereby achieving a compromise between performance and overheads.

In a possible implementation, the first information includes second information and an index of the first terminal, the second information is for determining the joint matrix, and the index of the first terminal is for determining the pilot used by the first terminal. In the possible implementation, the network device does not need to indicate the pilot to the terminal, and the first terminal determines the pilot based on the first information.

In a possible implementation, the second information is for indicating the transmit/receive full-dimensional statistical information corresponding to the $N_U$ terminals in the joint matrix; or the second information is for indicating Q transmit/receive angle spectral coefficients determined based on the joint matrix and indexes corresponding to the Q transmit/receive angle spectral coefficients; or the second information is for indicating $N_U*P$ transmit/receive angle spectral coefficients determined based on the transmit/receive full-dimensional statistical information corresponding to the $N_U$ terminals and indexes corresponding to the $N_U*P$ transmit/receive angle spectral coefficients, where each terminal in the $N_U$ terminals corresponds to P transmit/receive angle spectral coefficients and P indexes, and P indexes corresponding to the first terminal are indexes corresponding to P transmit/receive angle spectral coefficients corresponding to the first terminal, where both Q and P are integers greater than 0. In the possible implementation, in a case that the second information is the transmit/receive angle spectral coefficients and the indexes corresponding to the transmit/receive angle spectral coefficients, the first terminal may reconstruct the joint matrix based on the transmit/receive angle spectral coefficients and the indexes corresponding to the transmit/receive angle spectral coefficients. In this way, compared with directly sending, to the first terminal, the transmit/receive full-dimensional statistical information corresponding to the $N_U$ terminals in the joint matrix, signaling overheads can be reduced.

In a possible implementation, if a second terminal in the $N_U$ terminals does not need to send a pilot to the network device, the method further includes: The network device deletes an element corresponding to the second terminal from the joint matrix, to obtain an updated joint matrix; and the network device updates the first matrix based on the updated joint matrix.

In a possible implementation, if a second terminal in the $N_U$ terminals does not need to send a pilot to the network device, the method further includes: The network device sends an index of the second terminal to terminals other than the second terminal in the $N_U$ terminals, where the index of the second terminal is for updating the joint matrix. In the possible implementation, the network device may indicate an index of a to-be-deleted terminal through signaling, and a terminal may update the joint matrix based on the index of the to-be-deleted terminal, to update a used pilot. In this way, compared with indicating other information for determining the updated joint matrix, signaling overheads can be reduced.

In a possible implementation, if a third terminal other than the $N_U$ terminals needs to send a pilot to the network device, the method further includes: The network device determines transmit/receive full-dimensional statistical information corresponding to the third terminal; the network device adds the transmit/receive full-dimensional statistical information corresponding to the third terminal to the joint matrix, to obtain an updated joint matrix; and the network device updates the first matrix based on the updated joint matrix.

In a possible implementation, if a third terminal other than the $N_U$ terminals needs to send a pilot to the network device, the method further includes: The network device sends transmit/receive full-dimensional statistical information corresponding to the third terminal to the $N_U$ terminals, where the transmit/receive full-dimensional statistical information corresponding to the third terminal is for updating the joint matrix. In the possible implementation, the network device may indicate transmit/receive full-dimensional statistical information corresponding to a newly added terminal through signaling, and the third terminal may update the joint matrix based on the transmit/receive full-dimensional statistical information corresponding to the newly added terminal, to update a used pilot. In this way, compared with indicating information about an entire updated joint matrix by the network device to the third terminal, signaling overheads can be reduced.

In a possible implementation, that the network device obtains a first matrix based on the joint matrix includes: The network device obtains a second matrix based on the joint matrix, where the second matrix includes transmit end components of the joint matrix; and the network device determines the first matrix based on the second matrix.

In a possible implementation, that the network device determines the first matrix based on the second matrix includes: The network device obtains a third matrix based on the second matrix, where the third matrix includes direction information of the transmit end components of the joint matrix; and the network device determines the first matrix based on the third matrix.

In a possible implementation, that the network device determines the first matrix based on the third matrix includes: The network device determines that a matrix formed by eigenvectors of $N_P$ largest eigenvalues corresponding to the third matrix is the first matrix; or the network device determines that a matrix obtained by performing terminal-level power normalization on a matrix formed by eigenvectors of $N_P$ largest eigenvalues corresponding to the third matrix is the first matrix, where $N_P$ is a quantity of resources for transmitting the pilots, and $N_P$ is an integer greater than 1. In the possible implementation, if the first terminal determines that the matrix obtained by performing terminal-level power normalization on the matrix formed by the eigenvectors of $N_P$ largest eigenvalues corresponding to the third matrix is the first matrix, transmit power of base bands of different terminals is limited by power normalization, and the transmit power of the base bands of the different terminals is the same or similar, so that power is properly allocated to the terminal, and the determined pilot can more adapt to a channel.

In a possible implementation, that the network device determines the first matrix based on the second matrix includes: The network device obtains a third matrix based on the second matrix, where the third matrix includes direction information of the transmit end components of the joint matrix; the network device obtains a fourth matrix based on the second matrix, where the fourth matrix includes size information of the transmit end components of the joint matrix; the network device determines a fifth matrix based on the fourth matrix and a quantity of resources for transmitting the pilots, where the fifth matrix is used for power allocation of a transmit end component in each direction in the third matrix; and the network device determines the first matrix based on the third matrix and the fifth matrix. In the possible implementation, compared with the foregoing possible implementation, pilot estimation precision can be further improved.

In a possible implementation, that the network device determines the first matrix based on the third matrix and the fifth matrix includes: The network device multiplies the third matrix and the fifth matrix to obtain the first matrix; or the network device determines that a matrix obtained by multiplying the third matrix and the fifth matrix and performing terminal-level power normalization is the first matrix. In the possible implementation, if the first terminal determines that the matrix obtained by multiplying the third matrix and the fifth matrix and performing terminal-level power normalization is the first matrix, transmit power of base bands of different terminals is limited by power normalization, and the transmit power of the base bands of the different terminals is the same or similar, so that power is properly allocated to the terminal, and the determined pilot can more adapt to a channel.

In a possible implementation, that the network device obtains a first matrix based on the joint matrix includes: The network device obtains an initial first matrix based on the joint matrix; and the network device uses the initial first matrix as an initial solution, and obtains the first matrix based on an iteration method; or the network device uses the initial first matrix as an initial solution, obtains a sixth matrix based on an iteration method, and determines that a matrix obtained by performing terminal-level power normalization on the sixth matrix is the first matrix. In the possible implementation, if the joint matrix is approximately decomposed into the third matrix and the fourth matrix, an error may be eliminated based on the iteration method, to approximate to an optimal solution, and obtain a more precise first matrix.

In a possible implementation, the joint matrix is obtained by performing block-diagonal concatenation on $N_U$ pieces of transmit/receive full-dimensional statistical information, an $n_u{}^{th}$ piece of transmit/receive full-dimensional statistical information in the $N_U$ pieces of transmit/receive full-dimensional statistical information is transmit/receive full-dimensional statistical information of a channel between an $n_u{}^{th}$ terminal in the $N_U$ terminals and the network device, and $n_u$ is an integer greater than 0 and less than or equal to $N_U$. In the possible implementation, block-diagonal concatenation is performed on the $N_U$ pieces of transmit/receive full-dimensional statistical information to obtain the joint matrix, so that the joint matrix has a multi-terminal channel statistical feature, and the pilot determined based on the joint matrix can more adapt to a channel.

In a possible implementation, the $N_U$ pieces of transmit/receive full-dimensional statistical information are determined based on channel matrices of the $N_U$ terminals.

In a possible implementation, the method further includes: The network device allocates initial pilots and time-frequency resources for transmitting the initial pilots to the $N_U$ terminals, where time-frequency resources that are for transmitting the initial pilots and are of at least two terminals in the $N_U$ terminals are different; the network device receives the initial pilots of the $N_U$ terminals; and the network device determines channel matrices of the $N_U$ terminals based on the initial pilots of the $N_U$ terminals.

According to a third aspect, a communication apparatus is provided. The apparatus includes: a communication unit and a processing unit, where the communication unit is configured to receive first information from a network device, where the first information is determined based on a joint matrix, the joint matrix includes transmit/receive full-dimensional statistical information of channels between $N_U$ terminals and the network device, the joint matrix is for determining pilots of the $N_U$ terminals, the apparatus is a terminal in the $N_U$ terminals, and $N_U$ is an integer greater than 0; and the processing unit is configured to determine a pilot used by the apparatus based on the first information. For example, the communication apparatus provided in the third aspect may be a terminal.

In a possible implementation, the first information is the pilot corresponding to the apparatus in a first matrix, and the first matrix includes the pilots of the $N_U$ terminals.

In a possible implementation, the first information is a parameter obtained by transforming and compressing the pilot corresponding to the apparatus in a first matrix, and the first matrix may include the pilots of the $N_U$ terminals; and the processing unit is further configured to: obtain, based on the first information, the pilot corresponding to the apparatus in the first matrix through restoration.

In a possible implementation, the first information includes second information and an index of the apparatus, the second information is for determining the joint matrix, and the index of the apparatus is for determining the pilot used by the apparatus; and the processing unit is further configured to: determine, based on the second information, the joint matrix; determine a first matrix based on the joint matrix, where the first matrix includes the pilots of the Nu terminals; and determine, based on the index of the apparatus, the pilot used by the apparatus from the first matrix.

In a possible implementation, the second information is for indicating the transmit/receive full-dimensional statistical information corresponding to the $N_U$ terminals in the joint matrix; or the second information is for indicating Q transmit/receive angle spectral coefficients determined based on the joint matrix and indexes corresponding to the Q transmit/receive angle spectral coefficients; or the second information is for indicating $N_U * P$ transmit/receive angle spectral coefficients determined based on the transmit/receive full-dimensional statistical information corresponding to the $N_U$ terminals and indexes corresponding to the $N_U$*P transmit/receive angle spectral coefficients, where each terminal in the $N_U$ terminals corresponds to P transmit/receive angle spectral coefficients and P indexes, and the P indexes corresponding to the apparatus are indexes corresponding to the P transmit/receive angle spectral coefficients corresponding to the apparatus, where both Q and P are integers greater than 0.

In a possible implementation, if a second terminal in the $N_U$ terminals does not need to send a pilot to the network device, the communication unit is further configured to receive an index of the second terminal from the network device; the processing unit is further configured to delete, based on the index of the second terminal, an element corresponding to the second terminal from the joint matrix, to obtain an updated joint matrix; and the processing unit is further configured to update the first matrix based on the updated joint matrix.

In a possible implementation, if a third terminal other than the $N_U$ terminals needs to send a pilot to the network device, the communication unit is further configured to receive transmit/receive full-dimensional statistical information corresponding to the third terminal from the network device; the processing unit is further configured to add the transmit/receive full-dimensional statistical information corresponding to the third terminal to the joint matrix, to obtain an updated joint matrix; and the processing unit is further configured to update the first matrix based on the updated joint matrix.

In a possible implementation, the processing unit is further configured to: obtain a second matrix based on the joint matrix, where the second matrix includes transmit end components of the joint matrix; and determine the first matrix based on the second matrix.

In a possible implementation, the processing unit is further configured to: obtain a third matrix based on the second matrix, where the third matrix includes direction information of the transmit end components of the joint matrix; and determine the first matrix based on the third matrix.

In a possible implementation, the processing unit is further configured to: determine that a matrix formed by eigenvectors of NP largest eigenvalues corresponding to the third matrix is the first matrix; or determine that a matrix obtained by performing terminal-level power normalization on a matrix formed by eigenvectors of $N_P$ largest eigenvalues corresponding to the third matrix is the first matrix, where $N_P$ is a quantity of resources for transmitting the pilots, and NP is an integer greater than 1.

In a possible implementation, the processing unit is further configured to: obtain a third matrix based on the second matrix, where the third matrix includes direction information of the transmit end components of the joint matrix; obtain a fourth matrix based on the second matrix, where the fourth matrix includes size information of the transmit end components of the joint matrix; determine a fifth matrix based on the fourth matrix and a quantity of resources for transmitting the pilots, where the fifth matrix is used for power allocation of a transmit end component in each direction in the third matrix; and determine the first matrix based on the third matrix and the fifth matrix.

In a possible implementation, the processing unit is further configured to: multiply the third matrix and the fifth matrix to obtain the first matrix; or determine that a matrix obtained by multiplying the third matrix and the fifth matrix and performing terminal-level power normalization is the first matrix.

In a possible implementation, the processing unit is further configured to: obtain an initial first matrix based on the joint matrix; and use the initial first matrix as an initial solution, and obtain the first matrix by using an iteration apparatus; or use the initial first matrix as an initial solution, obtain a sixth matrix by using an iteration apparatus, and determine that a matrix obtained by performing terminal-level power normalization on the sixth matrix is the first matrix.

In a possible implementation, the joint matrix is obtained by performing block-diagonal concatenation on $N_U$ pieces of transmit/receive full-dimensional statistical information, an $n_u^{th}$ piece of transmit/receive full-dimensional statistical information in the $N_U$ pieces of transmit/receive full-dimensional statistical information is transmit/receive full-dimensional statistical information of a channel between an $n_u^{th}$ terminal in the $N_U$ terminals and the network device, and $n_u$ is an integer greater than 0 and less than or equal to $N_U$.

In a possible implementation, the $N_U$ pieces of transmit/receive full-dimensional statistical information are determined based on channel matrices of the $N_U$ terminals.

According to a fourth aspect, a communication apparatus is provided. The apparatus includes: a processing unit and a communication unit, where the processing unit is configured to obtain a joint matrix, where the joint matrix includes transmit/receive full-dimensional statistical information of channels between $N_U$ terminals and the network device, the joint matrix is for determining pilots of the $N_U$ terminals, and $N_U$ is an integer greater than 0; and the communication unit is configured to send first information to a first terminal, where the first information is for determining a pilot used by the first terminal, the first information is determined based on the joint matrix, and the first terminal is a terminal in the $N_U$ terminals. For example, the communication apparatus provided in the fourth aspect may be a network device.

In a possible implementation, the processing unit is further configured to obtain a first matrix based on the joint matrix, where the first matrix includes the pilots of the $N_U$ terminals; and the processing unit is further configured to determine the first information, where the first information is determined based on a pilot corresponding to the first terminal in the first matrix.

In a possible implementation, the first information is a pilot corresponding to the first terminal in the first matrix, or the first information is a parameter obtained by transforming and compressing a pilot corresponding to the first terminal in the first matrix.

In a possible implementation, the first information includes second information and an index of the first terminal, the second information is for determining the joint matrix, and the index of the first terminal is for determining the pilot used by the first terminal.

In a possible implementation, the second information is for indicating the transmit/receive full-dimensional statistical information corresponding to the $N_U$ terminals in the joint matrix; or the second information is for indicating Q transmit/receive angle spectral coefficients determined based on the joint matrix and indexes corresponding to the Q transmit/receive angle spectral coefficients; or the second information is for indicating $N_U$*P transmit/receive angle spectral coefficients determined based on the transmit/receive full-dimensional statistical information corresponding to the $N_U$ terminals and indexes corresponding to the $N_U$*P transmit/receive angle spectral coefficients, where each terminal in the $N_U$ terminals corresponds to P transmit/receive angle spectral coefficients and P indexes, and P indexes corresponding to the first terminal are indexes corresponding to P transmit/receive angle spectral coefficients corresponding to the first terminal, where both Q and P are integers greater than 0.

In a possible implementation, if a second terminal in the $N_U$ terminals does not need to send a pilot to the apparatus, the processing unit is further configured to delete an element corresponding to the second terminal from the joint matrix, to obtain an updated joint matrix; and the processing unit is further configured to update the first matrix based on the updated joint matrix.

In a possible implementation, if a second terminal in the $N_U$ terminals does not need to send a pilot to the apparatus, the communication unit is further configured to send an index of the second terminal to terminals other than the second terminal in the $N_U$ terminals, where the index of the second terminal is for updating the joint matrix.

In a possible implementation, if a third terminal other than the $N_U$ terminals needs to send a pilot to the apparatus, the processing unit is further configured to determine transmit/receive full-dimensional statistical information corresponding to the third terminal; the processing unit is further configured to add the transmit/receive full-dimensional statistical information corresponding to the third terminal to the joint matrix, to obtain an updated joint matrix; and the processing unit is further configured to update the first matrix based on the updated joint matrix.

In a possible implementation, if a third terminal other than the $N_U$ terminals needs to send a pilot to the apparatus, the communication unit is further configured to send transmit/receive full-dimensional statistical information corresponding to the third terminal to the $N_U$ terminals, where the transmit/receive full-dimensional statistical information corresponding to the third terminal is for updating the joint matrix.

In a possible implementation, the processing unit is further configured to: obtain a second matrix based on the joint matrix, where the second matrix includes transmit end components of the joint matrix; and determine the first matrix based on the second matrix.

In a possible implementation, the processing unit is further configured to: obtain a third matrix based on the second matrix, where the third matrix includes direction information of the transmit end components of the joint matrix; and determine the first matrix based on the third matrix.

In a possible implementation, the processing unit is further configured to: determine that a matrix formed by eigenvectors of $N_P$ largest eigenvalues corresponding to the third matrix is the first matrix; or determine that a matrix obtained by performing terminal-level power normalization on a matrix formed by eigenvectors of $N_P$ largest eigenvalues corresponding to the third matrix is the first matrix, where $N_P$ is a quantity of resources for transmitting the pilots, and $N_P$ is an integer greater than 1.

In a possible implementation, the processing unit is further configured to: obtain a third matrix based on the second matrix, where the third matrix includes direction information of the transmit end components of the joint matrix; obtain a fourth matrix based on the second matrix, where the fourth matrix includes size information of the transmit end components of the joint matrix; determine a fifth matrix based on the fourth matrix and a quantity of resources for transmitting the pilots, where the fifth matrix is used for power allocation of a transmit end component in each direction in the third matrix; and determine the first matrix based on the third matrix and the fifth matrix.

In a possible implementation, the processing unit is further configured to: multiply the third matrix and the fifth matrix to obtain the first matrix; or determine that a matrix obtained by multiplying the third matrix and the fifth matrix and performing terminal-level power normalization is the first matrix.

In a possible implementation, the processing unit is further configured to: obtain an initial first matrix based on the joint matrix; and use the initial first matrix as an initial solution, and obtain the first matrix by using an iteration apparatus; or use the initial first matrix as an initial solution, obtain a sixth matrix by using an iteration apparatus, and determine that a matrix obtained by performing terminal-level power normalization on the sixth matrix is the first matrix.

In a possible implementation, the joint matrix is obtained by performing block-diagonal concatenation on $N_U$ pieces of transmit/receive full-dimensional statistical information, an $n_u$ th piece of transmit/receive full-dimensional statistical information in the $N_U$ pieces of transmit/receive full-dimensional statistical information is transmit/receive full-dimensional statistical information of a channel between an $n_u^{th}$ terminal in the $N_U$ terminals and the apparatus, and $n_u$ is an integer greater than 0 and less than or equal to $N_U$.

In a possible implementation, the $N_U$ pieces of transmit/receive full-dimensional statistical information are determined based on channel matrices of the $N_U$ terminals.

In a possible implementation, the processing unit is further configured to allocate initial pilots and time-frequency resources for transmitting the initial pilots to the $N_U$ terminals, where time-frequency resources that are for transmitting the initial pilots and are of at least two terminals in the $N_U$ terminals are different; the communication unit is further configured to receive the initial pilots of the $N_U$ terminals; and the processing unit is further configured to determine channel matrices of the $N_U$ terminals based on the initial pilots of the $N_U$ terminals.

According to a fifth aspect, a communication apparatus is provided, including a processor. The processor is connected to a memory, the memory is configured to store computer-executable instructions, and the processor executes the computer-executable instructions stored in the memory, to implement any method provided in the first aspect to the second aspect. For example, the memory and the processor may be integrated, or may be independent components. In the latter case, the memory may be located inside the communication apparatus, or may be located outside the communication apparatus.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the communication apparatus further includes a communication interface and a communication bus, and the processor, the memory, and the communication interface are connected through the communication bus. The communication interface is configured to perform sending and receiving actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the communication apparatus exists in a product form of a chip.

According to a sixth aspect, a communication apparatus (or a chip) is provided, including a processor and an interface, where the processor is coupled to a memory through the interface, and when the processor executes computer-executable instructions in the memory, any method provided in the first aspect or the second aspect is performed.

According to a seventh aspect, a communication apparatus is provided, including a processor and a transceiver, where the processor is connected to the transceiver, and the processor performs, by using the transceiver, any method provided in the first aspect or the second aspect.

According to an eighth aspect, a communication apparatus is provided. The apparatus is configured to perform any method provided in the first aspect or the second aspect.

According to a ninth aspect, a communication system is provided, including the foregoing network device and the foregoing terminal.

According to a tenth aspect, a computer-readable storage medium is provided, including computer-executable instructions. When the computer-executable instructions are run on a computer, any method provided in the first aspect or the second aspect is performed.

According to an eleventh aspect, a computer program product including computer-executable instructions is provided. When the computer-executable instructions are run on a computer, any method provided in the first aspect or the second aspect is performed.

According to a twelfth aspect, a computer program is provided. When the computer program is run on a computer, any method provided in the first aspect or the second aspect is performed.

For effects brought by any implementation of the third aspect to the twelfth aspect, refer to effects brought by corresponding implementations of the first aspect or the second aspect. Details are not described herein again.

It should be noted that, the solutions in the foregoing aspects may be combined on the premise that the solutions are not contradictory.

BRIEF DESCRIPTION OF THE DRAWINGS

FIG. 4 is a schematic diagram of interaction of still another pilot determining method;

DETAILED DESCRIPTION OF THE EMBODIMENTS

In the descriptions, unless otherwise specified, "/" indicates "or". For example, A/B may indicate A or B. A term "and/or" describes only an association relationship between associated objects and indicates that there may be three relationships. For example, A and/or B may indicate the following three cases: only A exists, both A and B exist, and only B exists. In addition, "at least one" means one or more, and "a plurality of" means two or more. The terms such as "first" and "second" do not limit a quantity or an execution sequence, and the terms such as "first" and "second" do not indicate a definite difference.

It should be noted that, the term "example" or "for example" indicates used as an example, an illustration, or a description. Any embodiment described as an "example" or "for example" should not be explained as being more preferred or having more advantages than another embodiment. Use of the word "example", "for example", or the like is intended to present a related concept.

The embodiments may be applied to various communication systems, for example, a narrow band-Internet of Things (NB-IoT) system, a long term evolution (LTE) system, a $5^{th}$-generation (5G) system, a new radio (NR) system, a wireless local area network (WLAN) system, a satellite communication and future evolution system, and a system in which a plurality of communications are converged. The 5G system may be a non-standalone (NSA) 5G system or a standalone (SA) 5G system.

Figure 1:
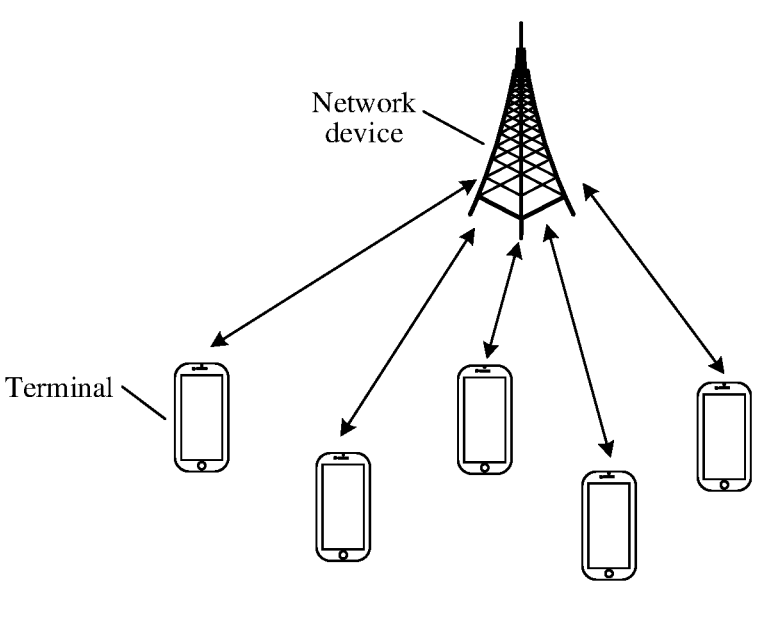
FIG. 1 is a schematic diagram of a network architecture.

A communication system in the embodiments includes at least one network device and one or more terminals. For example, FIG. 1 is a schematic diagram of a communication system to which the embodiments are applicable. The communication system may include at least one network device (only one network device is shown in FIG. 1) and a plurality of terminals (five terminals are shown in FIG. 1). The terminal may communicate with the network device, to transmit data and/or signaling. The plurality of terminals may be located in a same cell or may be located in different cells.

The network device is an entity that is on a network side and that is configured to send a signal, or receive a signal, or send a signal and receive a signal. The network device may be an apparatus that is deployed in a radio access network (RAN) and that provides a wireless communication function for the terminals. For example, the network device may be a base station. The network device may be a macro base station, a micro base station (also referred to as a small cell), a relay station, an access point (AP), or the like in any form, or may include a control node in any form, such as a network controller. The control node may be connected to a plurality of base stations and configure resources for the plurality of terminals covered by the plurality of base stations. In systems that use different radio access technologies, names of devices having functions of the base station may vary. For example, the base station may be referred to as an evolved NodeB (eNB) in an LTE system and may be referred to as a next generation node base station (gNB) in an NR system. A name of the base station is not limited. Alternatively, the network device may be a radio controller in a cloud radio access network (CRAN) scenario; a network device in a future evolved public land mobile network (PLMN); a transmission and reception point (TRP); a device that functions as a base station in device-to-device (D2D), vehicle-to-everything (V2X), machine-to-machine (M2M) communication, or Internet of Things communication, for example, a road side unit (RSU) in a V2X technology; and may further include a satellite or a gateway station in satellite communication.

The terminal is configured to provide one or more of a voice service and a data connectivity service for a user. The terminal is an entity that is on a user side and that is configured to receive a signal, send a signal, or receive a signal and send a signal. The terminal may also be referred to as user equipment (UE), a terminal device, an access terminal, a subscriber unit, a subscriber station, a mobile station, a remote station, a remote terminal, a mobile terminal, a mobile device, a user terminal, a wireless communication device, a user agent, or a user apparatus. The terminal may be a mobile station (MS), a subscriber unit, an unmanned aerial vehicle, an Internet of Things (IoT) device, a station (ST) in a wireless local area network (WLAN), a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a wireless modem, a handheld device with a wireless communication function, a computing device or another processing device connected to a wireless modem, an in-vehicle device, a wearable device (which may also be referred to as a wearable intelligent device), a device-to-device (D2D) terminal, a vehicle-to-everything (V2X) terminal, a machine-to-machine (M2M) terminal, an Internet of Things (IoT) terminal, a virtual reality (VR) terminal, an augmented reality (AR) terminal, a terminal in industrial control, a terminal in self driving, a terminal in remote medicine, a terminal in smart grid, a terminal in transportation safety, a terminal in smart city, a terminal in smart home, or the like. Alternatively, the terminal may be a terminal in a next-generation communication system.

The method may be applied to a time division duplexing (TDD) system or may be applied to a frequency division duplexing (FDD) system. This is not limited. The method may be applied to scenarios such as enhanced mobile broadband (eMBB), ultra-reliable low latency communication (URLLC), and enhanced machine-type communication (eMTC). In addition to being applied to a Massive-MIMO scenario, the method may also be applied to another similar scenario. This is not limited.

To make the method provided in the embodiments clearer, some concepts are first briefly described.

1. Pilot

The pilot may also be referred to as pilot information, a pilot signal, a reference signal (RS), a reference sequence, or the like. The pilot may be used for channel measurement. The pilot may include an uplink pilot and a downlink pilot. The uplink pilot is used for uplink channel measurement, and uplink CSI (or uplink channel matrix) estimation. The downlink pilot is used for downlink channel measurement, and downlink CSI (or downlink channel matrix) estimation. For example, the uplink pilot may be a sounding reference signal (SRS), and the downlink pilot may be a channel state information reference signal (CSI-RS). It should be understood that the reference signals listed above are merely examples and should not constitute any limitation. The embodiments do not exclude a possibility of defining another reference signal in a future protocol to implement a same or similar function.

A channel matrix is a mathematical definition of CSI in a multi-antenna (or multi-user) scenario. Description of the CSI is used in some scenarios, and description of the channel matrix is used in some scenarios. The CSI and the channel matrix may be considered to have a same meaning.

2. Power Normalization

Power normalization may also be referred to as normalizing power, in other words, normalization processing is performed on power (energy), so that same average power can be obtained in different modulation manners (or for all mapping manners). Power normalization may limit transmit power of base bands of different terminals and may enable the transmit power of the base bands of the different terminals to be the same or similar, so that power is properly allocated to a terminal, and a determined pilot can more adapt to a channel.

3. Resource Element (RE)

An RE is a smallest resource unit in physical resources, which occupies one orthogonal frequency division multiplexing (OFDM) symbol in the time domain and occupies one subcarrier in frequency domain.

4. Mathematical Symbols

In the following description, $A^H$ is a complex conjugate transposition matrix of a matrix A. In the following description, $A \otimes B$ is a Kronecker product of the matrix A and a matrix B. In the following description, $A \odot B$ is a Khatri-Rao product of the matrix A and the matrix B.

In embodiments, "*" means "multiply". If a dimension of a matrix is described as A*B, A before "*" indicates a quantity of rows of the matrix, and B after "*" indicates a quantity of columns of the matrix. If A is in a format of "CD", it indicates that A=C*D. B is similar. For example, in an $N_R N_T * N_R N_T$ matrix in the following description, $A = N_R N_T = N_R * N_T$, and $B = N_R N_T = N_R * N_T$. In other words, the $N_R N_T * N_R N_T$ matrix indicates a matrix in which a quantity of rows is $N_R * N_T$ and a quantity of columns is also $N_R * N_T$.

The foregoing briefly describes some concepts.

In some possible implementations, a pilot may be allocated to a terminal based on the following Solution 1 or Solution 2.

Solution 1

Orthogonal pilot: Two different antenna ports (which may be of different users or may be of a same user) perform multiplexing transmission over a time-frequency resource based on an orthogonal pilot. By using an example in which a time-frequency resource is two Res and two users send orthogonal pilots over the time-frequency resource, a pilot matrix X formed by pilot sequences sent by the two users is as follows:

$$X = \begin{bmatrix} x_{11} & x_{12} \\ x_{21} & x_{22} \end{bmatrix}$$

X is a pilot matrix whose dimension is 2*2, a first column vector $$X_1 = \begin{bmatrix} x_{11} \\ x_{21} \end{bmatrix}$$

and a second column vector $$X_2 = \begin{bmatrix} x_{12} \\ x_{22} \end{bmatrix}$$

are two-dimensional pilot sequences of a terminal 1 and a terminal 2 respectively, and $X_1$ and $X_2$ are orthogonal to each other. Two elements in a pilot sequence are respectively transmitted on the two Res. For example, $$X = \begin{bmatrix} 1 & 0 \\ 0 & 1 \end{bmatrix} \text{ or } X = \begin{bmatrix} 1 & -1 \\ 1 & 1 \end{bmatrix}.$$

Solution 2

Non-orthogonal pilot: By using an example in which a time-frequency resource is two Res and four users send orthogonal pilots over the time-frequency resource, a pilot matrix X formed by pilot sequences sent by the four users is as follows:

$$x = \begin{bmatrix} x_{11} & x_{12} & x_{13} & x_{14} \\ x_{21} & x_{22} & x_{23} & x_{24} \end{bmatrix}$$

X is a pilot matrix whose dimension is 2*4, four column vectors in X are two-dimensional pilot sequences of the four users, and two elements in each column vector are sent on the two Res. When a quantity of users is greater than a quantity of Res (in other words, a quantity of pilot sequences is greater than a quantity of elements in the pilot sequences), orthogonality of the pilot sequences cannot be ensured, in other words, the pilot sequences allocated to the four users are not orthogonal.

In Solution 1, pilot sequences that are orthogonal to each other may be obtained by performing cyclic shift on a root sequence (for example, a ZC sequence (such as a Zadoff-Chu sequence)). A root sequence with a length of N may have only N orthogonal sub-sequences through cyclic shift, and a quantity of the orthogonal sub-sequences is limited. When the pilot technology is used, pilot overheads linearly increase with a quantity of users. For a large quantity of users, orthogonal pilot sequences cannot be allocated to all users, and there is a pilot overhead bottleneck in a massive MIMO multi-user multiplexing scenario.

In Solution 2, a non-orthogonal pilot sequence may be obtained by performing cyclic shift on different root sequences (for example, ZC sequences) that have a cross-correlation. The pilot sequences do not have orthogonality. When CSI is estimated based on a pilot of a user, there is interference of a pilot of another user. As a result, an error of the estimated CSI increases, and pilot pollution is severe.

Figure 2:
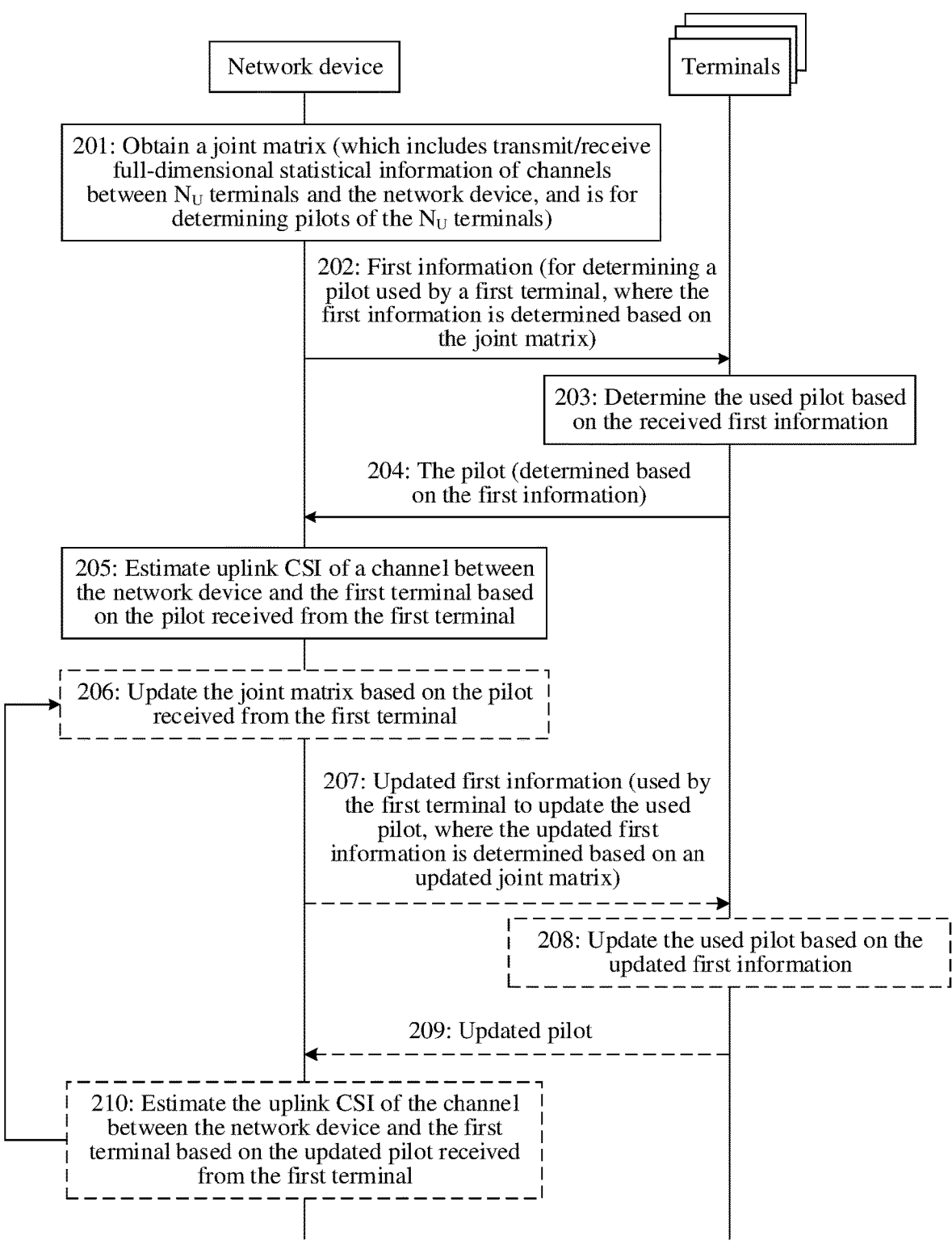
FIG. 2 is a schematic diagram of interaction of a pilot determining method.

Neither Solution 1 nor Solution 2 can meet a low-overhead and high-performance CSI detection requirement in a scenario in which a quantity of Massive-MIMO users increases. To balance pilot overheads and pilot interference between a plurality of terminals because a large quantity of terminals may use pilots and may meet the low-overhead and high-performance CSI detection requirement in the scenario in which the quantity of Massive-MIMO users increases, the embodiments may provide a pilot determining method. By properly introducing a multi-terminal channel statistical feature, a CSI estimation error can be reduced, and pilot overheads can also be reduced. Refer to FIG. 2. The method includes the following steps.

201: A network device obtains a joint matrix, where the joint matrix includes transmit/receive full-dimensional statistical information of channels between $N_U$ terminals and the network device, the joint matrix is for determining pilots of the $N_U$ terminals, and $N_U$ is an integer greater than 0.

The $N_U$ terminals may be located in a same cell or may be located in different cells. This is not limited. The transmit/receive full-dimensional statistical information is statistical information of a receive end (for example, the network device) and statistical information of a transmit end (for example, the $N_U$ terminals). The transmit/receive full-dimensional statistical information includes a statistical autocorrelation coefficient of any element in channel matrices of the channels between the $N_U$ terminals and the network device, and the transmit/receive full-dimensional statistical information further includes a statistical cross-correlation coefficient. The statistical cross-correlation coefficient may include a statistical cross-correlation coefficient between every two elements in each channel matrix in $N_U$ channel matrices; or may include a statistical cross-correlation coefficient between every two elements in different channel matrices in the $N_U$ channel matrices; or may include the statistical cross-correlation coefficient between every two elements in each channel matrix in the $N_U$ channel matrices, and may also include the statistical cross-correlation coefficient between every two elements in different channel matrices in the $N_U$ channel matrices. The $N_U$ channel matrices are respectively the channel matrices of the channels between the $N_U$ terminals and the network device. For ease of description, in the following description, the method is described by using an example in which the statistical cross-correlation coefficient includes the statistical cross-correlation coefficient between every two elements in each channel matrix in the $N_U$ channel matrices.

Optionally, the joint matrix is obtained by performing block-diagonal concatenation on $N_U$ pieces of transmit/receive full-dimensional statistical information, an $n_u^{th}$ piece of transmit/receive full-dimensional statistical information in the $N_U$ pieces of transmit/receive full-dimensional statistical information is transmit/receive full-dimensional statistical information of a channel between an $n_u^{th}$ terminal in the $N_U$ terminals and the network device, and n u is an integer greater than 0 and less than or equal to $N_U$. The $n_u^{th}$ piece of transmit/receive full-dimensional statistical information includes the statistical information of the receive end (for example, the network device) and statistical information of the $n_u^{th}$ terminal). Each transmit/receive full-dimensional statistical information in the $N_U$ pieces of transmit/receive full-dimensional statistical information may be a joint transmit/receive covariance estimation matrix.

If the joint matrix is denoted as $R_{hh}$ and the $n_u^{th}$ piece of transmit/receive full-dimensional statistical information is denoted as $R_{hh,n_u}$, $R_{hh}$ may be indicated as:

$$R_{hh} = \begin{bmatrix} R_{hh,1} & 0 & \cdots & 0 \\ 0 & R_{hh,2} & \vdots & 0 \\ \vdots & \vdots & \ddots & \vdots \\ 0 & 0 & \cdots & R_{hh,N_u} \end{bmatrix}$$

Optionally, the $N_U$ pieces of transmit/receive full-dimensional statistical information are determined based on channel matrices of the $N_U$ terminals.

It should be noted that, a channel matrix of each terminal may include a plurality of channel matrix samples, and the plurality of channel matrix samples may be a plurality of channel matrix samples obtained by the network device by performing, within a time range, uplink channel estimation based on uplink pilots sent by the terminal. For example, if a periodicity in which a terminal sends uplink pilots is 5 milliseconds (ms) and a time range is 100 ms, the network device may receive 20 uplink pilots, and may obtain 20 channel matrix samples by respectively performing uplink channel estimation based on the 20 uplink pilots. In this case, a channel matrix of the terminal includes 20 channel matrix samples. One channel matrix sample obtained by performing uplink channel estimation based on one uplink pilot may also be referred to as one CSI sample. It should be noted that, quantities of channel matrix samples included in channel matrices of different terminals may be the same or may be different. This is not limited.

For a terminal, a process of determining a transmit/receive full-dimensional statistical information corresponding to the terminal may include: respectively performing vectorization on all channel matrix samples in a channel matrix of the terminal, performing auto-correlation, and performing statistical averaging on all auto-correlated channel matrix samples to obtain the transmit/receive full-dimensional statistical information corresponding to the terminal. For example, assuming that a channel matrix of the $n_u^{th}$ terminal includes 15 channel matrix samples, the network device may separately perform vectorization on the 15 channel matrix samples to obtain 15 vectorized channel matrix samples, respectively perform auto-correlation on the 15 vectorized channel matrix samples to obtain 15 auto-correlated channel matrix samples, and perform statistical averaging on the 15 auto-correlated channel matrix samples to obtain the $n_u^{th}$ piece of transmit/receive full-dimensional statistical information.

Optionally, before step 201, the method further includes the following steps.

11) The network device allocates initial pilots and time-frequency resources for transmitting the initial pilots to the $N_U$ terminals. Correspondingly, the $N_U$ terminals receive the initial pilots and the time-frequency resources for transmitting the initial pilots that are allocated by the network device. It should be noted that, the $N_U$ terminals may receive, at same time or different time, the initial pilots and the time-frequency resources for transmitting the initial pilots that are allocated by the network device. This is not limited.

12) The $N_U$ terminals send the initial pilots corresponding to the $N_U$ terminals based on the initial pilots and the time-frequency resources for transmitting the initial pilots that are allocated by the network device. Correspondingly, the network device receives the initial pilots sent by the $N_U$ terminals. It should be noted that, the $N_U$ terminals may send the initial pilots at same time or different time. This is not limited.

13) The network device determines channel matrices of the $N_U$ terminals based on the initial pilots of the $N_U$ terminals. For implementation of this step, refer to the foregoing description. Details are not described again.

The initial pilots allocated by the network device to the $N_U$ terminals may be orthogonal pilots (for example, a ZC sequence obtained by performing cyclic shift based on a same root factor, and/or time-frequency resources that are for transmitting the initial pilots and are of at least two terminals in the $N_U$ terminals are different), and in this case, pilot estimation performance can be improved; and may also be non-orthogonal pilots (for example, a ZC sequence obtained by performing cyclic shift based on different root factors, and/or the time-frequency resources allocated to the $N_U$ terminals for transmitting the initial pilots are the same), and in this case, pilot estimation overheads can be reduced. Compared with the latter, the former can reduce inter-pilot interference, and improve precision of the channel matrices determined based on the initial pilots, so that precision of the obtained joint matrix is improved, and the pilots of the $N_U$ terminals determined based on the joint matrix more match a real channel statistical feature.

For an example of step 201, refer to step A in the following description.

202: The network device sends first information to a first terminal, where the first information is for determining a pilot used by the first terminal, and the first information is determined based on the joint matrix. Correspondingly, the first terminal receives the first information from the network device.

The first terminal may be any terminal in the $N_U$ terminals. During implementation of step 202, the network device may send corresponding first information to one or more terminals in the $N_U$ terminals. The plurality of terminals may be some or all terminals in the $N_U$ terminals. The terminals are in a one-to-one correspondence with the first information. First information corresponding to a terminal is used by the terminal to determine a used pilot. When sending first information to a terminal, the network device needs to send first information corresponding to the terminal. For ease of description, an example in which the network device sends the first information corresponding to the first terminal to the first terminal is used to describe a procedure of interaction between a terminal and an access network device. For a procedure of interaction between another terminal and the access network device, refer to a procedure of interaction between the first terminal and the access network device for understanding. Details are not described again.

For related description of the first information, refer to the following description.

203: The first terminal determines the used pilot based on the received first information.

The pilot herein is an uplink pilot, and may be, for example, an SRS.

If the network device sends corresponding first information to a plurality of terminals in the $N_U$ terminals, the plurality of terminals may determine used pilots based on the received first information.

Optionally, after step 203, the method further includes the following steps.

204: The first terminal sends, to the network device, the pilot determined based on the first information. Correspondingly, the network device receives the pilot from the first terminal.

It should be noted that, for any terminal, the terminal may directly perform step 204 without performing step 203. This is not limited.

When the plurality of terminals may determine the used pilots based on the received first information, the plurality of terminals may send the determined pilots to the network device.

205: The network device estimates uplink CSI of a channel between the network device and the first terminal based on the pilot received from the first terminal.

During implementation of step 205, the network device may separately estimate the uplink CSI of the channel between the network device and the first terminal based on the pilot received from the first terminal. When the plurality of terminals may send the pilots to the network device, to improve CSI estimation precision, after receiving the pilots sent by the plurality of terminals, the network device may estimate, in a multi-terminal joint manner, uplink CSI of channels between the network device and the plurality of terminals based on the joint matrix, to minimize an estimation error. For example, a method for performing multi-terminal joint channel estimation includes but is not limited to multi-user joint minimum least mean square error estimation (LMMSE). For an example, refer to step C in the following description.

Optionally, after step 205, the method further includes the following steps.

206: The network device updates the joint matrix based on the pilot received from the first terminal.

When the plurality of terminals may send the pilots to the network device, the network device may update the joint matrix based on the pilots received from the plurality of terminals. A method for updating the joint matrix is similar to a method for determining the joint matrix based on the initial pilots. For understanding, refer to the method for determining the joint matrix. Details are not described again.

207: The network device sends corresponding updated first information to the first terminal, where the updated first information is used by the first terminal to update the used pilot, and the updated first information is determined based on an updated joint matrix. Correspondingly, the first terminal receives the updated first information from the network device.

During implementation of step 207, the network device may send corresponding updated first information to one or more terminals in the $N_U$ terminals. For ease of description, an example in which the network device sends the updated first information corresponding to the first terminal to the first terminal is used to describe a procedure of interaction between a terminal and an access network device.

Before step 207, optionally, the network device may perform step 207 (such as update the pilot used by the terminal) in a case that the updated joint matrix changes greatly; or may not perform step 207 (such as does not update the pilot used by the terminal) if the updated joint matrix changes slightly. For example, in a case that a value obtained by performing a determinant operation on a first difference is greater than a first threshold or a trace of the first difference is greater than the first threshold, the network device may determine that the updated joint matrix changes greatly. The first difference is a difference between the updated joint matrix and the update-before joint matrix. The first threshold may be preset, or specified in a protocol, or determined by the network device and the terminals through negotiation. This is not limited.

Further, the network device may perform step 207 regardless of a change of the joint matrix.

208: The first terminal updates the used pilot based on updated first information.

If the network device sends corresponding updated first information to the plurality of terminals in the $N_U$ terminals, the plurality of terminals may determine updated pilots based on the received updated first information.

209: The first terminal sends the updated pilot to the network device. Correspondingly, the network device receives the updated pilot from the first terminal.

When the plurality of terminals may determine the updated pilots based on the received updated first information, the plurality of terminals may send the updated pilots to the network device.

210: The network device estimates the uplink CSI of the channel between the network device and the first terminal based on the updated pilot received from the first terminal.

During implementation of step 210, when the plurality of terminals may send the updated pilots to the network device, the network device may estimate, in a multi-terminal joint manner, the uplink CSI of the channels between the network device and the plurality of terminals based on the updated joint matrix, to minimize the estimation error.

After step 210, step 206 to step 210 may continue to be performed. Through the process, iterative convergence of the joint matrix and uplink CSI estimation precision can be achieved.

It should be noted that, in step 207, in another possible implementation, the network device does not send the corresponding updated first information to the first terminal but sends the third information. The third information is transmit/receive full-dimensional statistical information of Z terminals in the updated joint matrix and indexes of the Z terminals; or a plurality of transmit/receive angle spectral coefficients and indexes corresponding to the plurality of transmit/receive angle spectral coefficients that are extracted from the transmit/receive full-dimensional statistical information of the Z terminals in the updated joint matrix, and the indexes of the Z terminals, where Z is an integer greater than 0. The network device may compare transmit/receive full-dimensional statistical information corresponding to each terminal in the updated joint matrix with that in the update-before joint matrix and determine terminals whose transmit/receive full-dimensional statistical information changes greatly as the Z terminals. In this case, during implementation of step 208, the first terminal updates the transmit/receive full-dimensional statistical information of the Z terminals based on the third information, to update the joint matrix. Other terminals are also similar. Details are not described again. In the possible implementation, information of a terminal whose transmit/receive full-dimensional statistical information changes greatly is selectively transferred, so that signaling overheads caused by a change in a terminal channel feature can be reduced.

For any terminal, for example, in a case that a value obtained by performing a determinant operation on a second difference is greater than a second threshold or a trace of the second difference is greater than the second threshold, the network device may determine that the terminal is a terminal whose transmit/receive full-dimensional statistical information changes greatly. The second difference is a difference between transmit/receive full-dimensional statistical information of the terminal in the updated joint matrix and transmit/receive full-dimensional statistical information of the terminal in the update-before joint matrix. The second threshold may be preset, or specified in a protocol, or determined by the network device and the terminals through negotiation. This is not limited.

In the method provided in this embodiment, a multi-terminal channel statistical feature is introduced in a process of determining a pilot used by a terminal, and compared with directly allocating a pilot to a terminal (that is, not introducing the multi-terminal channel statistical feature) in conventional technologies, the determined pilot can better match the channel statistical feature, so that CSI estimation precision can be improved. As the CSI estimation precision is improved, fewer pilots can be used by the terminal to achieve same CSI estimation precision. Therefore, pilot overheads can also be reduced.

By using the first terminal in the $N_U$ terminals as an example, the foregoing first information may include but is not limited to the following three cases: Case 1, Case 2, and Case 3. The following describes an example of a process in which the first terminal determines the pilot used by the first terminal in the three cases.

Case 1: The first information is a pilot corresponding to the first terminal in a first matrix.

The first matrix includes the pilots of the $N_U$ terminals, and the first matrix may be determined based on the joint matrix. The first matrix may also be referred to as a multi-user pilot matrix.

Figure 3:
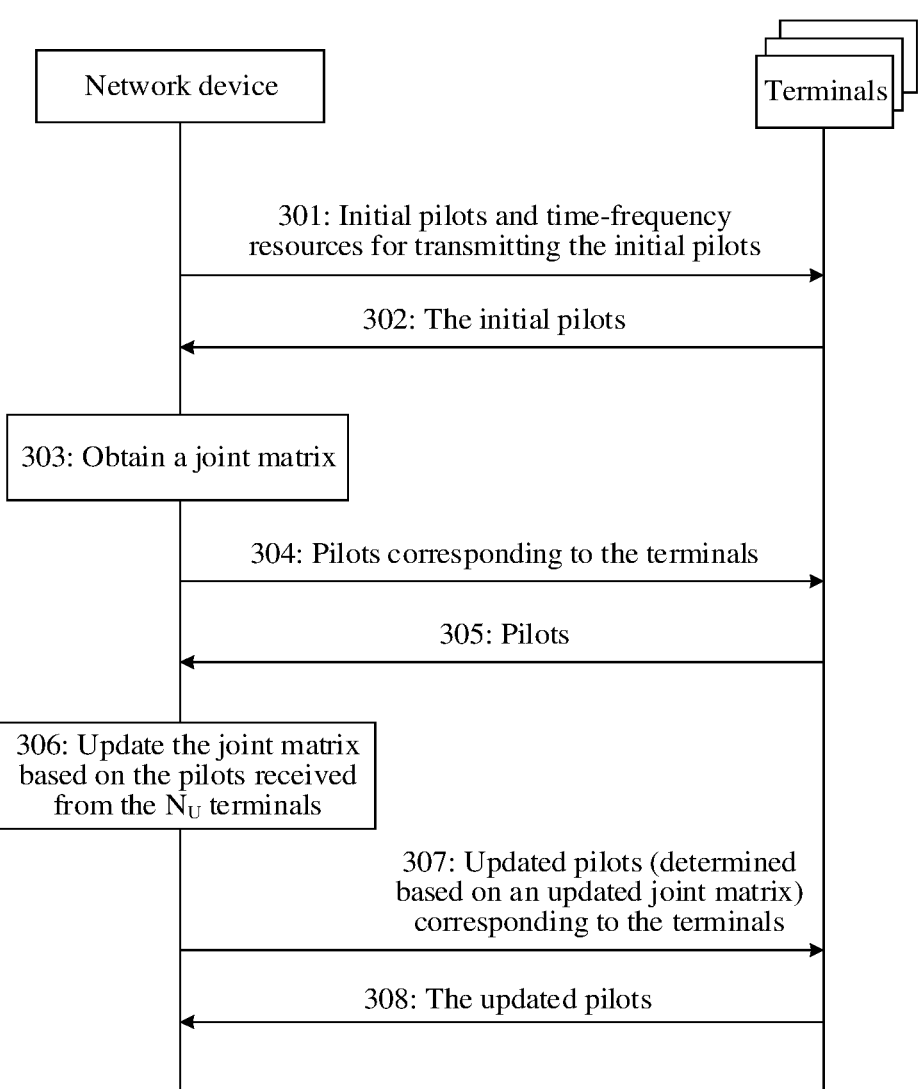
FIG. 3 is a schematic diagram of interaction of still another pilot determining method.

In Case 1, for example, for a pilot update procedure of the foregoing method, refer to FIG. 3. The procedure includes the following steps.

301: A network device allocates initial pilots and time-frequency resources for transmitting the initial pilots to $N_U$ terminals. Correspondingly, the $N_U$ terminals receive the initial pilots and the time-frequency resources for transmitting the initial pilots that are allocated by the network device. For related description of step 301, refer to step 11).

302: The $N_U$ terminals send the initial pilots corresponding to the $N_U$ terminals based on the initial pilots and the time-frequency resources for transmitting the initial pilots that are allocated by the network device. Correspondingly, the network device receives the initial pilots sent by the $N_U$ terminals. For related description of step 302, refer to step 12).

303: The network device obtains a joint matrix. For related description of step 303, refer to step 201.

304: The network device respectively sends, to the $N_U$ terminals, the pilots corresponding to the $N_U$ terminals. For interaction between the network device and each terminal, refer to an interaction progress between the first terminal and the network device for understanding. For related description of step 304, refer to step 202. The first information in step 202 is replaced with the pilot in Case 1 for understanding.

305: The $N_U$ terminals separately send the pilots to the network device. The pilots are indicated by the network device to the terminals in step 304. Correspondingly, the network device receives the pilots from the $N_U$ terminals. For interaction between the network device and each terminal, refer to an interaction progress between the first terminal and the network device for understanding. For related description of step 305, refer to step 204. The first information in step 204 is replaced with the pilot in Case 1 for understanding.

306: The network device updates the joint matrix based on the pilots received from the $N_U$ terminals. For related description of step 306, refer to step 206.

307: The network device determines updated pilots of the $N_U$ terminals based on an updated joint matrix. For related description of step 307, refer to step 207. The first information in step 207 is replaced with the pilot in Case 1 for understanding.

308: The network device respectively sends, to the $N_U$ terminals, the updated pilots corresponding to the $N_U$ terminals. For interaction between the network device and each terminal, refer to an interaction progress between the first terminal and the network device for understanding. In a subsequent process, step 305 to step 308 may be cyclically performed, and a difference lies in that the pilots used by the $N_U$ terminals in step 305 to step 308 are the updated pilots.

It should be noted that, in FIG. 3 and FIG. 4 to FIG. 7 in the following description, interaction between the network device and the $N_U$ terminals is used as an example for description. In actual implementation, the network device may perform interaction with some terminals in the $N_U$ terminals. This is not limited.

Case 2: The first information is a parameter obtained by transforming and compressing a pilot corresponding to the first terminal in a first matrix.

A purpose of transforming and compressing the pilot corresponding to the first terminal is to reduce transmission resources and reduce resource overheads. For example, the pilot corresponding to the first terminal may be transformed into a discrete Fourier transformation (DFT) field to obtain a compressed parameter, and the first information may be some or all of the parameter.

In Case 2, during implementation, step 203 may include: The first terminal obtains, based on the first information, the pilot corresponding to the first terminal in the first matrix through restoration.

In Case 2, for example, if a parameter obtained by transforming and compressing a pilot corresponding to the $n_u^{th}$ terminal in the first matrix is denoted as $q_{n_u}$, $q_{n_u}=WX_{n_u}$. $X_{n_u}$ indicates a matrix formed by column vectors corresponding to the $n_u^{th}$ terminal in a first matrix X, and W indicates a transformation matrix. W includes but is not limited to a DFT matrix. The first information may be a coefficient in which first K' modulus values are largest in $q_{n_u}$. A value of K' is determined based on signaling overhead and pilot precision requirements. A lower signaling overhead requirement (or a lower pilot precision requirement) indicates a smaller value of K'. In this case, after receiving the first information, the terminal may obtain, based on the first information, the pilot corresponding to the first terminal in the first matrix through restoration. $X_{n_u}=W^H\tilde{q}_{n_u}$, where $\tilde{q}_{n_u}$ indicates an $N_P$-dimensional vector extended by adding 0 to the foregoing coefficient in which the first K' modulus values are largest, $N_P$ is a quantity of resources for transmitting the pilot (such as a quantity of pilot resources), and $N_P$ is an integer greater than 1. In this case, the network device does not transmit a pilot, but performs DFT oversampling fitting on a pilot corresponding to a terminal and transfers a DFT oversampling fitting coefficient to each terminal in a signaling manner. Each terminal generates a pilot based on the DFT oversampling coefficient, so that signaling overheads can be reduced.

In Case 2, for example, for a pilot update procedure of the foregoing method, refer to FIG. 4. The procedure includes the following steps.

401: Same as step 301.

402: Same as step 302.

403: Same as step 303.

404: The network device respectively sends, to the $N_U$ terminals, parameters corresponding to the $N_U$ terminals, where a parameter corresponding to a terminal is a parameter obtained by performing transformation and compression based on a pilot corresponding to the terminal. For interaction between the network device and each terminal, refer to an interaction progress between the first terminal and the network device for understanding. For related description of step 404, refer to step 202. The first information in step 202 is replaced with the parameter in Case 2 for understanding.

405: The $N_U$ terminals separately send the pilots to the network device. Correspondingly, the network device receives the pilots from the $N_U$ terminals. The pilots are obtained through restoration by the terminals based on the parameters indicated by the network device in step 404. For interaction between the network device and each terminal, refer to an interaction progress between the first terminal and the network device for understanding. For related description of step 405, refer to step 204. The first information in step 204 is replaced with the parameter in Case 2 for understanding.

406: Same as step 306.

407: Same as step 307.

408: Same as step 308.

In Case 1 and Case 2, the method further includes the following steps.

21) The network device obtains the first matrix based on the joint matrix.

22) The network device determines the first information, where the first information is determined based on the pilot corresponding to the first terminal in the first matrix.

For implementation of step 21), refer to the following description. During implementation of step 22), for Case 1, the network device may determine that the pilot corresponding to the first terminal in the first matrix is the first information. For Case 2, the network device may perform transformation and compression on the pilot corresponding to the first terminal in the first matrix and determine that some or all of the parameter obtained by transformation and compression is the first information.

Compared with Case 1, in Case 2, the network device indicates, to the terminal, the DFT oversampling coefficient corresponding to the pilot, instead of the pilot, so that signaling overheads for indicating the pilot by the network device to the terminal can be reduced, thereby achieving a compromise between performance and overheads.

Case 3: The first information includes second information and an index of the first terminal, the second information is for determining the joint matrix, and the index of the first terminal is for determining the pilot used by the first terminal.

In Case 3, during implementation, step 203 may include: The first terminal determines, based on the second information, the joint matrix; the first terminal determines a first matrix based on the joint matrix; and the first terminal determines, based on the index of the first terminal, the pilot used by the first terminal from the first matrix.

Figure 5:
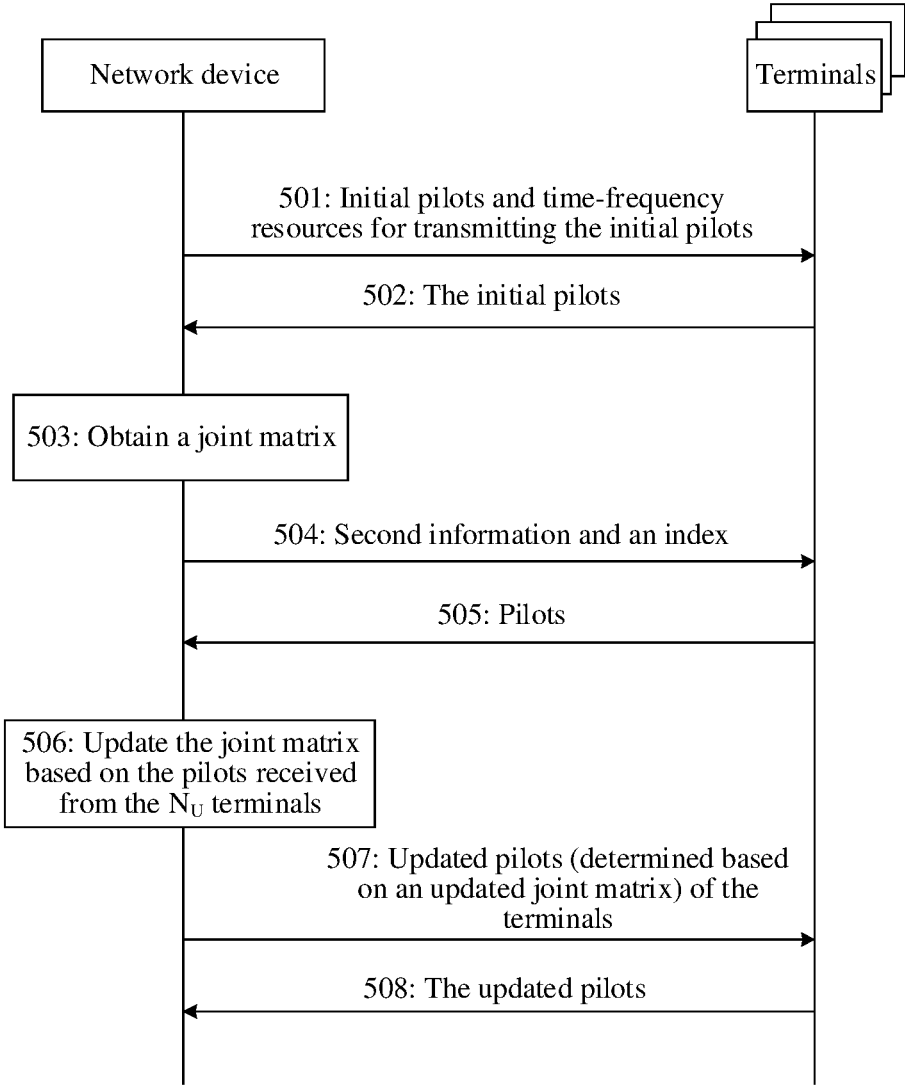
FIG. 5 is a schematic diagram of interaction of still another pilot determining method.
Figure 6:
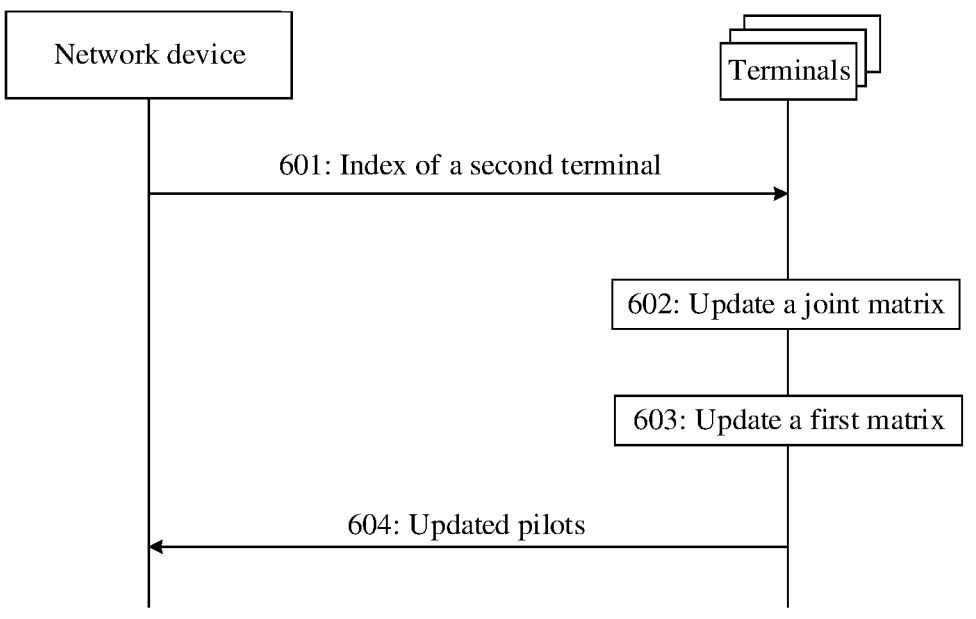
FIG. 6 is a schematic diagram of interaction of still another pilot determining method.
Figure 7:
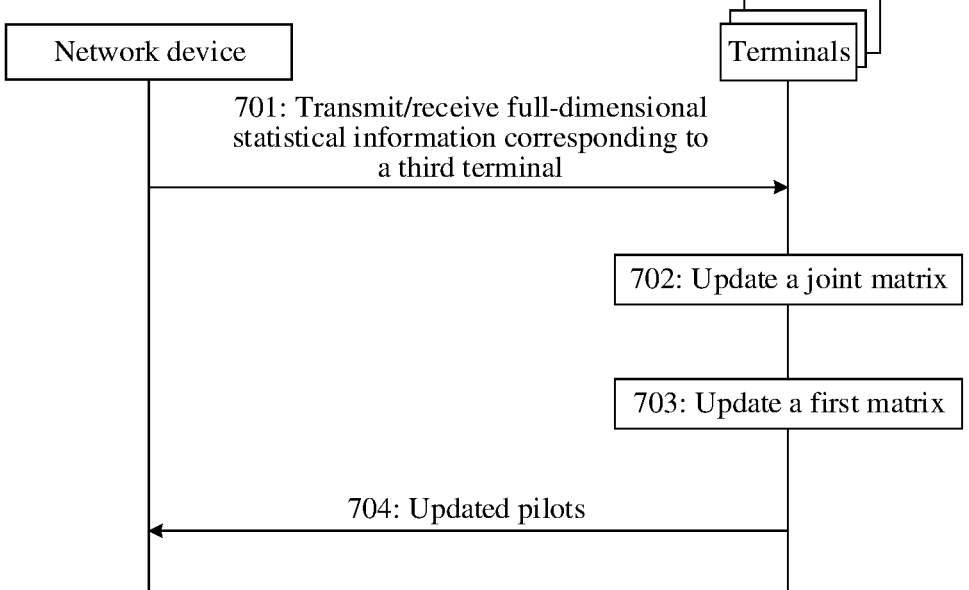
FIG. 7 is a schematic diagram of interaction of still another pilot determining method.

In Case 3, for example, for a pilot update procedure of the foregoing method, refer to FIG. 5. The procedure includes the following steps.

501: Same as step 301.

502: Same as step 302.

503: Same as step 303.

504: The network device respectively sends the second information and indexes to the $N_U$ terminals. The second information sent by the network device to all terminals is the same, and an index sent by the network device to a terminal is the index of the terminal. For interaction between the network device and each terminal, refer to an interaction progress between the first terminal and the network device for understanding. For related description of step 504, refer to step 202. The first information in step 202 is replaced with the second information and the index in Case 3 for understanding.

505: The $N_U$ terminals separately send the pilots to the network device. Correspondingly, the network device receives the pilots from the $N_U$ terminals. The pilots are obtained through restoration by the terminals based on the second information and the indexes of the terminals that are indicated by the network device in step 504. For interaction between the network device and each terminal, refer to an interaction progress between the first terminal and the network device for understanding. For related description of step 505, refer to step 204. The first information in step 204 is replaced with the second information and the index in Case 3 for understanding.

506: Same as step 306.

507: Same as step 307.

508: Same as step 308.

In Case 3, a function of the second information may include, but is not limited to, the following three types.

In a first possible implementation, the second information indicates the transmit/receive full-dimensional statistical information corresponding to the $N_U$ terminals in the joint matrix.

In the possible implementation, for the $n_u{}^{th}$ terminal, the second information may be a quantized value of $R_{hh,n_u}$.

In the possible implementation, after receiving the second information, the terminal may obtain the joint matrix by performing block-diagonal concatenation on the transmit/receive full-dimensional statistical information corresponding to the $N_U$ terminals.

In a second possible implementation, the second information indicates Q transmit/receive angle spectral coefficients determined based on the joint matrix and indexes corresponding to the Q transmit/receive angle spectral coefficients, where Q is an integer greater than 0.

In the possible implementation, for each terminal, the second information may include quantized values of Q transmit/receive angle spectral coefficients $\{g_1, g_2, \ldots, g_Q\}$, quantized values of receive indexes $\{I_{rx,1}, I_{rx,2}, \ldots, I_{rx,Q}\}$ corresponding to the Q transmit/receive angle spectral coefficients, and quantized values of transmit indexes $\{I_{tx,1}, I_{tx,2}, \ldots I_{tx,Q}\}$ corresponding to the Q transmit/receive angle spectral coefficients that are extracted from $R_{hh}$. $I_{rx,q}$ and $I_{tx,q}$ are respectively a receive index and a transmit index corresponding to a $q^{th}$ transmit/receive angle spectral coefficient $g_q$ in the Q transmit/receive angle spectral coefficients, and q is an integer greater than 0 and less than or equal to Q.

In the possible implementation, after receiving the second information, the terminal may reconstruct the joint matrix based on the Q transmit/receive angle spectral coefficients and the indexes corresponding to the Q transmit/receive angle spectral coefficients. For example, the joint matrix is reconstructed by performing a Khatri-Rao product on the Q transmit/receive angle spectral coefficients and the indexes corresponding to the Q transmit/receive angle spectral coefficients.

In a third possible implementation, the second information indicates $N_U*P$ transmit/receive angle spectral coefficients determined based on the transmit/receive full-dimensional statistical information corresponding to the $N_U$ terminals and indexes corresponding to the $N_U*P$ transmit/receive angle spectral coefficients. Each terminal in the $N_U$ terminals corresponds to P transmit/receive angle spectral coefficients and P indexes, and P indexes corresponding to a terminal are indexes corresponding to P transmit/receive angle spectral coefficients corresponding to the terminal. For example, P indexes corresponding to the first terminal are indexes corresponding to P transmit/receive angle spectral coefficients corresponding to the first terminal. P transmit/receive angle spectral coefficients and P indexes corresponding to a terminal may be determined based on transmit/receive full-dimensional statistical information corresponding to the terminal. P is an integer greater than 0.

In the possible implementation, for an $n_u{}^{th}$ terminal, the second information may include quantized values of P transmit/receive angle spectral coefficients $\{g_1, g_2, \ldots, g_P\}$, quantized values of receive indexes $\{I_{rx,1}, I_{rx,2}, \ldots I_{rx,P}\}$ corresponding to the P transmit/receive angle spectral coefficients, and quantized values of transmit indexes $\{I_{tx,1}, I_{tx,2}, \ldots, I_{tx,P}\}$ corresponding to the P transmit/receive angle spectral coefficients that are extracted from $R_{hh,n_u}$. $I_{rx,p}$ and $I_{tx,p}$ are respectively a receive index and a transmit index corresponding to a $p^{th}$ transmit/receive angle spectral coefficient $g_p$ in the P transmit/receive angle spectral coefficients, and p is an integer greater than 0 and less than or equal to P.

A method for obtaining a transmit/receive angle spectral coefficient and an index corresponding to the transmit/receive angle spectral coefficient is well known by a person skilled in the art. Details are not described herein again. Values of Q and P may be values determined by the network device based on allowed downlink overheads, where the allowed downlink overheads may be specified in a protocol.

In the possible implementation, after receiving the second information, the terminal may reconstruct the joint matrix based on the $N_U*P$ transmit/receive angle spectral coefficients and the indexes corresponding to the $N_U*P$ transmit/receive angle spectral coefficients. For example, the joint matrix is reconstructed by performing a Khatri-Rao product on the $N_U*P$ transmit/receive angle spectral coefficients and the indexes corresponding to the $N_U*P$ transmit/receive angle spectral coefficients.

In the possible implementation, to reduce calculation complexity, an example in which different terminals correspond to a same quantity of transmit/receive angle spectral coefficients and indexes is used for description. In actual implementation, different terminals may correspond to different quantities of transmit/receive angle spectral coefficients and indexes. This is not limited.

In Case 3, the network device transfers the second information and a terminal index to each terminal in a signaling manner, and each terminal may reconstruct the joint matrix accordingly and obtain a pilot that matches a channel statistical feature of the terminal. To ensure pilot consistency between a receive end and a transmit end, the network device and the terminal may predefine a matched pilot construction method or construction precision parameter. For an example in which the terminal determines, based on the second information, the joint matrix, refer to step D in the following description.

In the foregoing embodiment, a process in which the terminal and the network device determine the first matrix based on the joint matrix may be implemented in the following Manner I or Manner II.

Manner I

Manner I may include the following steps.

31) Obtain a second matrix based on the joint matrix, where the second matrix includes transmit end components of the joint matrix. The transmit end components of the joint matrix are statistical information of transmit ends (such as the $N_U$ terminals) in the joint matrix. The transmit end components (such as the second matrix) of the joint matrix and receive end components of the joint matrix that are in a form of a Kronecker product may be obtained by approximately decomposing the joint matrix. A Kronecker product approximate decomposition method includes, but is not limited to, Kronecker Product SVD.

32) Determine the first matrix based on the second matrix.

Step 32) may be implemented in the following Manner 1 or Manner 2.

Manner 1

Manner 1 may include the following steps.

41) Obtain a third matrix based on the second matrix, where the third matrix includes direction information of the transmit end components of the joint matrix. The third matrix may be obtained by performing eigen decomposition, for example, eigenvalue decomposition (EVD) decomposition or SVD decomposition, on the second matrix. The third matrix is an eigenvector corresponding to an eigenvalue obtained by performing eigen decomposition on the second matrix. For example, the direction information may be an equivalent angle of departure (AOD) (which may also be referred to as a departure angle).

42) Determine the first matrix based on the third matrix.

Step 42) may be implemented in the following Manner 1.1 or Manner 1.2.

Manner 1.1

Manner 1.1 may include: determining that a matrix formed by eigenvectors of Np largest eigenvalues corresponding to the third matrix is the first matrix.

Manner 1.2

Manner 1.2 may include: determining that a matrix obtained by performing terminal-level power normalization on a matrix formed by eigenvectors of $N_P$ largest eigenvalues corresponding to the third matrix is the first matrix. It should be noted that, in the matrix formed by the eigenvectors of $N_P$ largest eigenvalues corresponding to the third matrix, each terminal corresponds to one or more column vectors, and performing terminal-level power normalization may be understood as performing power normalization on the column vectors corresponding to each terminal. For example, a power normalization method may be Frobenius normalization.

In Manner 1.1 and Manner 1.2, Np is a quantity of resources for transmitting the pilots (such as a quantity of pilot resources), and Np is an integer greater than 1. The pilot resources herein are resources reused by the $N_U$ terminals, in other words, the $N_U$ terminals all send the pilots over the resources, and the quantity of resources in the resources is $N_P$. The quantity of resources herein may be a quantity of Res.

In Manner 1.1 and Manner 1.2, it should be noted that, after eigen decomposition is performed on the matrix, eigenvectors in the decomposed matrix may be sorted in descending order of the eigenvalues. In this case, the eigenvectors of $N_P$ largest eigenvalues corresponding to the third matrix may be first $N_P$ eigenvectors in the third matrix.

Manner 2

Manner 2 may include the following steps.

51) Obtain a third matrix based on the second matrix, where the third matrix includes direction information of the transmit end components of the joint matrix.

52) Obtain a fourth matrix based on the second matrix, where the fourth matrix includes size information of the transmit end components of the joint matrix. The third matrix and the fourth matrix may be obtained by performing eigen decomposition, for example, EVD decomposition or SVD decomposition, on the second matrix. The fourth matrix is an eigenvalue obtained by performing eigen decomposition on the second matrix. The third matrix is an eigenvector corresponding to the eigenvalue obtained by performing eigen decomposition on the second matrix.

53) Determine a fifth matrix based on the fourth matrix and a quantity of resources for transmitting the pilots, where the fifth matrix is used for power allocation of a transmit end component in each direction in the third matrix.

54) Determine the first matrix based on the third matrix and the fifth matrix.

Step 54) may be implemented in the following Manner 2.1 or Manner 2.2.

Manner 2.1

Manner 2.1 may include: multiplying the third matrix and the fifth matrix to obtain the first matrix.

Manner 2.2

Manner 2.2 may include: determining that a matrix obtained by multiplying the third matrix and the fifth matrix and performing terminal-level power normalization is the first matrix. It should be noted that, in a matrix formed by multiplying the third matrix and the fifth matrix, each terminal corresponds to one or more column vectors, and performing terminal-level power normalization may be understood as performing power normalization on the column vectors corresponding to each terminal.

Manner II

Manner II may include the following steps.

61) Obtain an initial first matrix based on the joint matrix. The initial first matrix may be the first matrix determined in any one of the foregoing Manner 1 or Manner 2.

62) Use the initial first matrix as an initial solution and obtain the first matrix based on an iteration method; or use the initial first matrix as an initial solution, obtain a sixth matrix based on an iteration method, and determine that a matrix obtained by performing terminal-level power normalization on the sixth matrix is the first matrix. For example, based on the initial first matrix, the first matrix may be obtained based on the iteration method such as a matrix gradient method, with a criterion such as minimizing a channel estimation mean square error as a target.

It should be noted that, if the joint matrix is approximately decomposed into the third matrix and the fourth matrix, an error may be eliminated based on the iteration method, to approximate to an optimal solution, and obtain a more precise first matrix. For an example in which the terminal and the network device determine the first matrix, refer to step B in the following description.

In the foregoing embodiments, in addition to updating the first matrix based on the pilots sent by the $N_U$ terminals, in a case that some terminals in the $N_U$ terminals may not need to send pilots (denoted as Case I) or another terminal other than the $N_U$ terminals needs to send a pilot (denoted as Case II), the first matrix also needs to be updated. The following describes an example of a process of updating the first matrix in Case I and Case II.

Case I: A second terminal in the $N_U$ terminals does not need to send a pilot to the network device.

In a case that the second terminal enters an idle state, or the second terminal leaves a coverage area of the network device, or the second terminal is powered off, the network device may determine that the second terminal does not need to send a pilot to the network device.

In Case I, the method further includes the following steps.

71) The network device deletes an element corresponding to the second terminal from the joint matrix, to obtain an updated joint matrix.

72) The network device updates the first matrix based on the updated joint matrix.

For the foregoing Case 1 and Case 2, after obtaining the updated first matrix, the network device determines the first information based on the updated first matrix and sends the corresponding first information to each terminal. In a subsequent process, when the first matrix is updated, the network device may determine the first information based on the updated first matrix and send the corresponding first information to each terminal.

In Case I, for the foregoing Case 3, the method further includes the following steps.

81) The network device sends an index of the second terminal to terminals other than the second terminal in the $N_U$ terminals, where the index of the second terminal is for updating the joint matrix. Correspondingly, the terminals other than the second terminal in the Nu terminals receive the index of the second terminal from the network device.

82) The terminals other than the second terminal in the $N_U$ terminals delete, based on the index of the second terminal, an element corresponding to the second terminal in the joint matrix, to obtain an updated joint matrix.

83) The terminals other than the second terminal in the $N_U$ terminals update the first matrix based on the updated joint matrix.

In Case I, for the foregoing Case 3, after obtaining the updated first matrix, each terminal may determine a pilot used by the terminal based on the updated first matrix. For a determining method, refer to the foregoing description. Details are not described again. In a subsequent process, when the first matrix is updated, the terminal may re-determine the pilot used by the terminal based on the updated first matrix. In this case, for example, for a pilot update procedure in Case I, refer to FIG. 6. The procedure includes the following steps.

601: A network device sends an index of a second terminal to terminals other than a second terminal in $N_U$ terminals. Correspondingly, the terminals other than the second terminal in the $N_U$ terminals receive the index of the second terminal from the network device. For related description of step 601, refer to step 81).

602: The terminals other than the second terminal in the $N_U$ terminals update a joint matrix. Each terminal may update the joint matrix. For a process in which the terminal updates the joint matrix, refer to step 82).

603: The terminals other than the second terminal in the $N_U$ terminals update a first matrix. Each terminal may update the first matrix based on the joint matrix. For related description of step 603, refer to step 83).

604: The terminals other than the second terminal in the $N_U$ terminals send updated pilots to the network device. An updated pilot of a terminal is determined based on the updated first matrix and an index of the terminal.

In Case I, the network device may indicate an index of a to-be-deleted terminal through signaling, and a terminal may update the joint matrix based on the index of the to-be-deleted terminal, to update a used pilot. In this way, compared with indicating other information for determining the updated joint matrix, signaling overheads can be reduced.

Case II: A third terminal other than the $N_U$ terminals needs to send a pilot to the network device.

In a case that the third terminal enters a connected state, or the third terminal leaves a coverage area of the network device, or the third terminal is powered on, the network device may determine that the third terminal needs to send a pilot to the network device.

In Case II, the method further includes the following steps.

91) The network device determines transmit/receive full-dimensional statistical information corresponding to the third terminal.

The network device may separately allocate an initial pilot and a resource for transmitting the initial pilot to the third terminal. The third terminal transmits the initial pilot over the resource, and the network device receives the initial pilot and determines the transmit/receive full-dimensional statistical information corresponding to the third terminal based on the initial pilot. A process thereof is similar to a process of determining the transmit/receive full-dimensional statistical information corresponding to the $N_U$ terminals. For understanding, refer to the process of determining the transmit/receive full-dimensional statistical information corresponding to the $N_U$ terminals. Details are not described again. The initial pilot allocated to the third terminal may be independent of the pilots that are currently used by the $N_U$ terminals and that are determined based on the first matrix, so that the pilots currently used by the $N_U$ terminals have as little impact as possible on estimation of the transmit/receive full-dimensional statistical information corresponding to the third terminal.

92) The network device adds the transmit/receive full-dimensional statistical information corresponding to the third terminal to the joint matrix, to obtain an updated joint matrix.

93) The network device updates the first matrix based on the updated joint matrix.

For the foregoing Case 1 and Case 2, after obtaining the updated first matrix, the network device determines the first information based on the updated first matrix and sends the corresponding first information to each terminal. In a subsequent process, when the first matrix is updated, the network device may determine the first information based on the updated first matrix and send the corresponding first information to each terminal.

In Case II, for the foregoing Case 3, the method further includes the following steps.

101) The network device sends transmit/receive full-dimensional statistical information corresponding to the third terminal to each terminal in the $N_U$ terminals, where the transmit/receive full-dimensional statistical information corresponding to the third terminal is for updating the joint matrix. Correspondingly, the $N_U$ terminals receive the transmit/receive full-dimensional statistical information corresponding to the third terminal from the network device.

102) Each terminal in the $N_U$ terminals adds the transmit/receive full-dimensional statistical information corresponding to the third terminal to the joint matrix, to obtain an updated joint matrix.

103) Each terminal in the $N_U$ terminals updates the first matrix based on the updated joint matrix.

In Case II, for the foregoing Case 3, after obtaining the updated first matrix, each terminal may determine a pilot used by the terminal based on the updated first matrix. For a determining method, refer to the foregoing description. Details are not described again. In a subsequent process, when the first matrix is updated, the terminal may re-determine the pilot used by the terminal based on the updated first matrix. In this case, for example, for a pilot update procedure in Case II, refer to FIG. 7. The procedure includes the following steps.

701: A network device sends transmit/receive full-dimensional statistical information corresponding to a third terminal to $N_U$ terminals. Correspondingly, the $N_U$ terminals receive the transmit/receive full-dimensional statistical information corresponding to the third terminal from the network device. For related description of step 601, refer to step 101).

702: The $N_U$ terminals update a joint matrix. Each terminal may update the joint matrix. For a process in which the terminal updates the joint matrix, refer to step 102).

703: The $N_U$ terminals update a first matrix. Each terminal may update the first matrix based on the joint matrix. For related description of step 703, refer to step 103).

704: The $N_U$ terminals send updated pilots to the network device. An updated pilot of a terminal is determined based on the updated first matrix and an index of the terminal.

In Case II, the network device may indicate transmit/receive full-dimensional statistical information corresponding to a newly added terminal through signaling, and the Nu terminals may update the joint matrix based on the transmit/receive full-dimensional statistical information corresponding to the newly added terminal, to update a used pilot. In this way, compared with indicating information about an entire updated joint matrix by the network device to the $N_U$ terminals, signaling overheads can be reduced.

It should be noted that, the methods in Case I and Case II may be performed in any phase after step 201. This is not limited.

To make the foregoing embodiments clearer, the following describes some steps in the foregoing embodiments by using examples. In the examples, a quantity of receive antennas of the network device is denoted as $N_R$, a quantity of transmit antennas of each terminal is denoted as $N_T$, a quantity of terminals is denoted as $N_U$, and a quantity of pilot resources is denoted as $N_P$. It should be noted that, a same quantity of transmit antennas is not limited for the $N_U$ terminals. In a case that the $N_U$ terminals have different quantities of transmit antennas, a difference lies only in that quantities of columns in channel matrices of different terminals are different. In this way, a quantity of rows and a quantity of columns in transmit/receive full-dimensional statistical information may be different, but implementation is not affected. It should be noted that, the examples do not constitute a limitation on corresponding steps. In actual implementation, the steps may be alternatively implemented in another manner. This is not limited.

Step A: Obtain a joint matrix.

Step A may include the following content.

A1: The network device allocates initial pilots and resources for transmitting the initial pilots to the $N_U$ terminals. Correspondingly, the $N_U$ terminals separately receive the initial pilots and the resources for transmitting the initial pilots that are allocated by the network device.

For example, in a case, the network device may allocate non-orthogonal pilots to the $N_U$ terminals, and in this case, pilot estimation overheads can be reduced. In another case, the network device allocates orthogonal pilots to the $N_U$ terminals, and in this case, pilot estimation performance can be improved.

A2: The $N_U$ terminals send the initial pilots over the corresponding resources for transmitting the initial pilots. Correspondingly, the network device receives the initial pilots sent by the $N_U$ terminals over the corresponding resources for transmitting the initial pilots.

A3: The network device calculates transmit/receive full-dimensional statistical information corresponding to each terminal based on the initial pilots sent by the $N_U$ terminals.

A process in which the network device obtains transmit/receive full-dimensional statistical information corresponding to an $n_u{}^{th}$ terminal includes the following steps.

The network device performs, within a time range, uplink channel estimation based on an uplink pilot sent by the $n_u{}^{th}$ terminal, to obtain K channel matrix samples, where each channel matrix sample is a matrix whose dimension is $N_R*N_T$, a $k^{th}$ channel matrix sample in the K channel matrix samples is denoted as $H_{n_u,k}$, K is an integer greater than 0, and k is an integer greater than 0 and less than or equal to K.

The network device respectively performs column vectorization (such as performs vertical concatenation of column vectors) on the K channel matrix samples, to obtain K matrices whose dimensions are $N_R N_T*1$ (which may also be described as $N_R N_T$-dimensional column vectors), where a $k^{th}$ matrix whose dimension is $N_R N_T*1$ is denoted as $$V_{H_{n_u,k}}.$$

The network device respectively performs auto-correlation on the K matrices whose dimensions are $N_R N_T*1$, that is, multiplies each matrix whose dimension is $N_R N_T*1$ and a conjugate transposition matrix of the matrix, to obtain an $N_R N_T*N_R N_T$ matrix, so that K $N_R N_T*N_R N_T$ matrices may be obtained in total.

The network device performs statistical averaging on the K $N_R N_T*N_R N_T$ matrices (that is, adds and averages elements at a same position in the K $N_R N_T*N_R N_T$ matrices), to obtain the transmit/receive full-dimensional statistical information corresponding to the $n_u{}^{th}$ terminal. If the transmit/receive full-dimensional statistical information corresponding to the $n_u{}^{th}$ terminal may be denoted as $$R_{hh,n_u}, R_{hh,n_u} = K^{-1}\sum_{k=1}^{K} V_{H_{n_u,k}} V_{H_{n_u,k}}^H.$$

For example, if $N_R=5$ and $N_T=3$, $R_{hh,n_u}$ is a 15*15 matrix.

It should be noted that, when vectorization is performed on a channel matrix sample, row vectorization may also be performed to obtain a matrix whose dimension is $1*N_R N_T$ (which may also be described as $N_R N_T$-dimensional row vectors). Column vectorization is used as an example for description. If a result obtained by the statistical averaging approaches 0, a pilot used by a terminal cannot be determined based on the joint matrix. In this way, by performing auto-correlation on the K $N_R N_T$-dimensional column vectors, the result obtained by the statistical averaging can be prevented from approaching 0.

A4: The network device performs block-diagonal concatenation on $N_U$ pieces of transmit/receive full-dimensional statistical information to obtain a joint matrix $R_{hh}$:

$$R_{hh} = \begin{bmatrix} R_{hh,1} & 0 & \cdots & 0 \\ 0 & R_{hh,2} & \vdots & 0 \\ \vdots & \vdots & \ddots & \vdots \\ 0 & 0 & \cdots & R_{hh,N_u} \end{bmatrix}$$

It may be understood that, if $N_R=5$, $N_T=3$, and $N_U=10$, $R_{hh}$ is a 150*150 matrix.

Step B: Obtain a first matrix based on the joint matrix (which is applicable to both the terminals and the network device).

Step B may include the following content.

B1: Approximately decompose the joint matrix into transmit end components (such as the foregoing second matrix) of the joint matrix and receive end components of the joint matrix that are in a form of a Kronecker product. A Kronecker product approximate decomposition method includes, but is not limited to, Kronecker Product SVD.

It can be understood from the foregoing description that the joint matrix includes statistical information of a receive end and statistical information of transmit ends. By decomposing the joint matrix, the transmit end components (such as the statistical information of the transmit ends, denoted as $R_{hh,Tx}$) of the joint matrix and the receive end components (such as the statistical information of the receive end, denoted as $R_{hh,Rx}$) of the joint matrix may be obtained. In this case, $R_{hh}$ may be indicated as:

$$R_{hh} \approx R_{hh,Tx} \otimes R_{hh,Rx}$$

$R_{hh,Tx}$ is a matrix whose dimension is $N_U N_T*N_U N_T$, and $R_{hh,Rx}$ is a matrix whose dimension is $N_R*N_R$. Both $R_{hh,Tx}$ and $R_{hh,Rx}$ are covariance matrices. For example, if $N_R=5$, $N_T=3$, and $N_U=10$, $R_{hh,Tx}$ is a 30*30 matrix, and $R_{hh,Rx}$ is a 5*5 matrix. A purpose of the embodiments may be to determine pilots of the transmit ends (such as the $N_U$ terminals). Therefore, in a subsequent process, only $R_{hh,Tx}$ is further processed.

B2: Perform eigen decomposition on $R_{hh,Tx}$ to obtain direction information (denoted as $U_{R_{hh,Tx}}$, so that a third matrix may be $U_{R_{hh,Tx}}{}^H$) of the transmit end components of the joint matrix and size information (such as the foregoing fourth matrix, denoted as $D_{R_{hh,Tx}}$) of the transmit end components of the joint matrix.

The eigen decomposition method includes, but is not limited to, EVD decomposition and SVD decomposition. Row vectors in $U_{R_{hh,Tx}}{}^H$ are arranged in descending order of corresponding eigenvalues, column vectors in $U_{R_{hh,Tx}}$ are orthogonal to each other, $D_{R_{hh,Tx}}$ is a diagonal matrix, and diagonal elements in the diagonal matrix are arranged in descending order. Both $U_{R_{hh,Tx}}$ and $D_{R_{hh,Tx}}$ are matrices whose dimensions are $N_U N_T*N_U N_T$.

B3: Determine the first matrix.

In a first manner, a matrix that is in a dimension of $N_P*N_U N_T$ and that is formed by first $N_P$ row vectors of $U_{R_{hh,Tx}}{}^H$ is determined as a first matrix X, such as $$X = \left[ U_{R_{hh,Tx}}^H \right]_{1:N_P,:}$$

In a subscript "1:$N_P$,:" in the formula, a part before "," indicates a quantity of obtained rows, a part after "," and before ":" indicates a quantity of obtained columns, "1:$N_P$" indicates that the quantity of obtained rows is a first row to an $N_P{}^{th}$ row, and no content before ":" and after "," indicates that all columns are obtained. Similar subscripts in the following description have similar meanings, and details are not described in the following description.

In a second manner, a matrix obtained by performing terminal-level power normalization on $$\left[ U_{R_{hh,Tx}}^H \right]_{1:N_P,:}$$

is determined as a first matrix X. It should be noted that, $$\left[ U_{R_{hh,Tx}}^H \right]_{1:N_P,:}$$

is a matrix with $N_U N_T$ columns, and each $N_T$ column vectors in the matrix correspond to one terminal in $N_U$ terminals. Performing terminal-level power normalization on $$\left[ U_{R_{hh,Tx}}^H \right]_{1:N_P,:}$$

may be understood as performing power normalization on the column vectors corresponding to each terminal.

In a third manner, power water filling is performed based on $D_{R_{hh,Tx}}$ and $N_P$, to obtain a power allocation diagonal matrix $D_X$ whose dimension is $N_P*N_P$, where a first matrix $$X = D_X * \left[ U_{R_{hh,Tx}}^H \right]_{1:N_P,:}$$

It should be noted that, the diagonal matrix $D_X$ determined by power water filling may include a diagonal element whose value is 0.

In a fourth manner, a matrix obtained by performing terminal-level power normalization on $$D_X * \left[ U_{R_{hh},Tx}^H \right]_{1:N_P,:}$$

is determined as a first matrix X. Compared with the first manner and the second manner, the third manner and the fourth manner may further improve pilot estimation precision.

In a fifth manner, the first matrix determined in any one of the first manner to the fourth manner is used as an initial solution (such as the foregoing initial first matrix), and a first matrix with better performance is obtained through iteration based on a method such as a matrix gradient method.

In a sixth manner, the first matrix determined in any one of the first manner to the fourth manner is used as an initial solution (such as the foregoing initial first matrix), a matrix with better performance is obtained through iteration based on a method such as a matrix gradient method, and a matrix obtained by performing terminal-level power normalization on the matrix is determined as a first matrix X.

It should be noted that, the first matrix is an $N_P*N_U N_T$ matrix, and a pilot of a single user corresponds to a matrix whose dimension is $N_P*N_T$.

Step C: The network device performs multi-terminal joint channel estimation.

A process in which the network device performs multi-terminal joint channel estimation based on LMMSE includes:)

$$\hat{h}=W^H y, \ W^H=R_{hh} (X\otimes I_{N_R})^H ((X\otimes I_{N_R})R_{hh} (X\otimes I_{N_R})^H + \sigma_Z^2)^{-1}$$

$\hat{h}$ is uplink CSI obtained through estimation. $\hat{H}$ is an $N_R N_T N_U$-dimensional column vector formed by channel estimation value vectors, where an $n^{th}$ $N^R$-dimensional subvector corresponds to a channel estimation value vector corresponding to a (mod(n, $N^T$))th transmit port of an $$\left\lceil \frac{n}{N_T} \right\rceil th \text{ terminal.}$$

Mod(n, $N_T$) indicates a modulo operation performed by an integer n on an integer $N_T$.

$$\left\lceil \frac{n}{N_T} \right\rceil$$

indicates rounding up of $$\frac{n}{N_T} \cdot y$$

is an $N_P N_R$-dimensional column vector, where y is obtained by performing vertical concatenation of $N_P$ $N_R$-dimensional column vectors, and one $N_R$-dimensional column vector is a pilot received by the network device over one resource in $N_P$ resources. $W^H$ indicates a channel estimation weight value. $\Sigma_Z^2$ indicates noise power. $I_{N_R}$ is a unit matrix whose dimension is $N_R*N_R$.

Step D: The terminals determine the joint matrix based on second information.

By using an example in which a function of the second information is the foregoing second possible implementation, the terminals may reconstruct the joint matrix by performing a Khatri-Rao product on transmit/receive angle spectral coefficients, that is:

$$R_{hh} = (W_t \odot W_r)D_g(W_t \odot W_r)^H$$

$$D_g = \text{diag}([g_1, \ g_2, \ldots, \ g_Q])$$

$$\left\{ W_r = \left[ [W_{rx}]_{:,J_{rx,1}}, \ [W_{rx}]_{:,J_{rx,2}}, \ [W_{rx}]_{:,J_{rx,Q}} \right] \right\}$$

$$W_t = \left[ [W_{tx}]_{:,J_{tx,1}}, \ [W_{tx}]_{:,J_{tx,2}}, \ [W_{tx}]_{:,J_{tx,Q}} \right]$$

$D_g$ indicates a diagonal matrix formed by Q transmit/receive angle spectral coefficients $\{g_1, g_2, \ldots, g_Q\}$ extracted from $R_{hh}$. $W_{rx}$ and $W_{tx}$ separately indicate a receive angle spectral matrix and a transmit angle spectral matrix, and $W_{rx}$ and $W_{tx}$ are information that can be learned by both a receive end and a transmit end, where the information is consistent at the receive end and the transmit end. For example, $W_{rx}$ and $W_{tx}$ may be DFT matrices.

In step D, an example in which the function of the second information is the foregoing second possible implementation is used to describe a process of reconstructing the joint matrix. If the function of the second information is the foregoing third possible implementation, each terminal may calculate transmit/receive full-dimensional statistical information of the $N_U$ terminals, and then perform block-diagonal concatenation on the transmit/receive full-dimensional statistical information of the $N_U$ terminals to obtain the joint matrix. For each terminal, a Khatri-Rao product may be performed based on a transmit/receive angle spectral coefficient corresponding to the terminal, to reconstruct transmit/receive full-dimensional statistical information of the terminal. A reconstruction process is similar to the process shown in step D. For understanding, refer to the process shown in step D. Details are not described again.

In the method provided in the foregoing embodiments, a pilot with a Kronecker product feature is directly or indirectly constructed based on a change of a multi-terminal channel statistical feature (or a multi-terminal channel joint statistical feature, such as a joint matrix) (where the multi-terminal channel statistical feature may be obtained by construction by performing a Khatri-Rao product on channel transmit/receive component parameters (for example, angle spectral coefficients)), pilot sending signaling and procedure in an initial state and an iterative state are added to effectively estimate the multi-terminal channel statistical feature. Based on the multi-terminal channel statistical feature, correlations may be introduced between pilots. Compared with a conventional orthogonal pilot technology, the channel statistical feature can better match, thereby improving CSI estimation precision. In addition, the introduction of the correlations between the pilots can reduce pilot overheads. In addition, a network device adjusts the pilots based on the multi-terminal channel statistical feature, to minimize a CSI estimation error, thereby matching the channel statistical feature. Kronecker product approximate decomposition may be performed on the multi-terminal channel statistical feature to obtain transmit end components (or a virtual transmit end correlation matrix) in the multi-terminal channel statistical feature, and an optimal pilot is determined through iteration based on eigenvectors and eigenvalues of the transmit end components. Kronecker product features of pilots can be decoupled from the transmit end components obtained through Kronecker product approximate decomposition, so that an optimal pilot signal can be further determined through iteration of an eigenvector and an eigenvalue.

The embodiments may be described by using an example in which involved information is arranged in a form of a matrix. In actual implementation, the information may not be arranged in the form of the matrix. For example, the information may be discrete information or information arranged in another form. This is not limited.

It should be noted that, in the foregoing description, an example in which a pilot is an uplink pilot is used for description. In actual implementation, the pilot may also be a downlink pilot, for example, a CSI-RS. The network device may estimate uplink CSI based on reciprocity of uplink and downlink channels and pilots sent by a plurality of terminals, determine a plurality of pieces of downlink CSI based on a plurality of pieces of uplink CSI, construct a joint matrix based on the plurality of pieces of downlink CSI, and determine a downlink pilot based on the joint matrix. For a process, refer to the foregoing description for understanding. Details are not described again.

In addition, in addition to being an uplink pilot or a downlink pilot, the pilot may also be a demodulation reference signal (DMRS). In this case, information related to the uplink pilot or the downlink pilot in the foregoing process is replaced with DMRS-related information for understanding. Details are not described herein again.

It should be noted that, when sending or receiving information, a plurality of terminals mentioned in the foregoing embodiments may simultaneously send or receive the information or may not simultaneously send or receive the information. This is not limited. For example, when receiving first information corresponding to the plurality of terminals, the plurality of terminals may simultaneously receive the first information or may not simultaneously receive the first information. This is not limited.

The foregoing describes the embodiments from a perspective of a method. It may be understood that, to implement the foregoing functions, each network element, for example, a network device or a terminal, includes at least one of a corresponding hardware structure or a corresponding software module for performing each function. A person skilled in the art should easily be aware that, in combination with units and algorithm steps of the examples, the embodiments may be implemented by hardware or a combination of hardware and computer software. Whether a function is performed by hardware or hardware driven by computer software depends on the embodiments. A person skilled in the art may use different methods to implement the described functions of each embodiment, but it should not be considered that the implementation goes beyond the scope of the embodiments.

In the embodiments, the network device and the terminal may be divided into functional units based on the foregoing method examples. For example, each functional unit may be obtained through division based on each corresponding function, or two or more functions may be integrated into one processing unit. The integrated unit may be implemented in a form of hardware or may be implemented in a form of a software function unit. It should be noted that, in the embodiments, division into the units is an example, and is merely a logical function division. In actual implementation, another division manner may be used.

Figure 8:
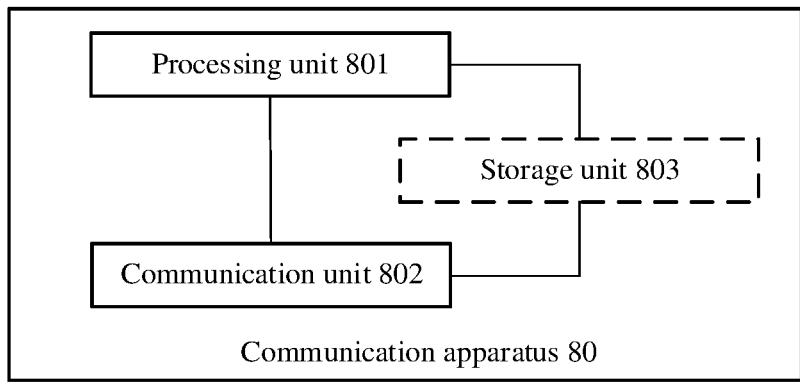
FIG. 8 is a schematic diagram of composition of a communication apparatus.

For example, FIG. 8 is a schematic diagram of a possible structure of a communication apparatus (denoted as a communication apparatus 80) in the foregoing embodiments. The communication apparatus 80 includes a processing unit 801 and a communication unit 802. Optionally, the communication apparatus further includes a storage unit 803. The communication apparatus 80 may be configured to show structures of the terminal and the network device in the foregoing embodiments.

When the schematic diagram of the structure shown in FIG. 8 is used to show a structure of the terminal in the foregoing embodiments, the processing unit 801 is configured to control and manage actions of the terminal. For example, the processing unit 801 is configured to perform 202, 203, 204, 207, 208, and 209 in FIG. 2, 301, 302, 304, 305, 307, and 308 in FIG. 3, 401, 402, 404, 405, 407, and 408 in FIG. 4, and 501, 502, 504, 505, 507, and 508 in FIG. 5, 601 to 604 in FIG. 6, 701 to 704 in FIG. 7, and/or actions performed by the terminal in another process described in the embodiments. The processing unit 801 may communicate with another network entity through the communication unit 802, for example, communicate with the network device in FIG. 2 (for example, receive first information from the network device, and send a pilot to the network device). The storage unit 803 is configured to store program code and data of the terminal.

When the schematic diagram of the structure shown in FIG. 8 is used to show a structure of the network device in the foregoing embodiments, the processing unit 801 is configured to control and manage actions of the network device. For example, the processing unit 801 is configured to perform 201, 202, 204, 205, 206, 207, 209, and 210 in FIG. 2, 301 to 308 in FIG. 3, 401 to 408 in FIG. 4, 501 to 508 in FIG. 5, 601 and 604 in FIG. 6, and 701 and 704 in FIG. 7, and/or actions performed by the network device in another process described in the embodiments. The processing unit 801 may communicate with another network entity through the communication unit 802, for example, communicate with the terminal in FIG. 2 (for example, send first information to the terminal, or receive a pilot from the terminal). The storage unit 803 is configured to store program code and data of the network device.

For example, the communication apparatus 80 may be a device, or may be a chip or a chip system.

When the communication apparatus 80 is a device, the processing unit 801 may be a processor; and the communication unit 802 may be a communication interface, a transceiver, or an input interface and/or an output interface. Optionally, the transceiver may be a transceiver circuit. Optionally, the input interface may be an input circuit, and the output interface may be an output circuit.

When the communication apparatus 80 is a chip or a chip system, the communication unit 802 may be a communication interface, an input interface and/or an output interface, an interface circuit, an output circuit, an input circuit, a pin, a related circuit, or the like on the chip or the chip system. The processing unit 801 may be a processor, a processing circuit, a logic circuit, or the like.

When an integrated unit in FIG. 8 is implemented in a form of a software function module and sold or used as an independent product, the integrated unit may be stored in a computer-readable storage medium. Based on such an understanding, the embodiments may be implemented in the form of a software product. The computer software product is stored in a storage medium and includes a plurality of computer-executable instructions for instructing a computer device (which may be a personal computer, a server, or a network device) or a processor to perform all or some of the steps of the methods described in the embodiments. A storage medium for storing the computer software product includes any medium that can store program code, such as a USB flash drive, a removable hard disk, a read-only memory (ROM), a random access memory (RAM), a magnetic disk, or a optical disc.

Figure 9:
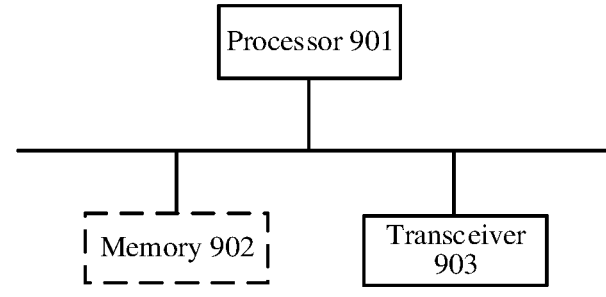
FIG. 9 is a schematic diagram of a hardware structure of a communication apparatus.
Figure 10:
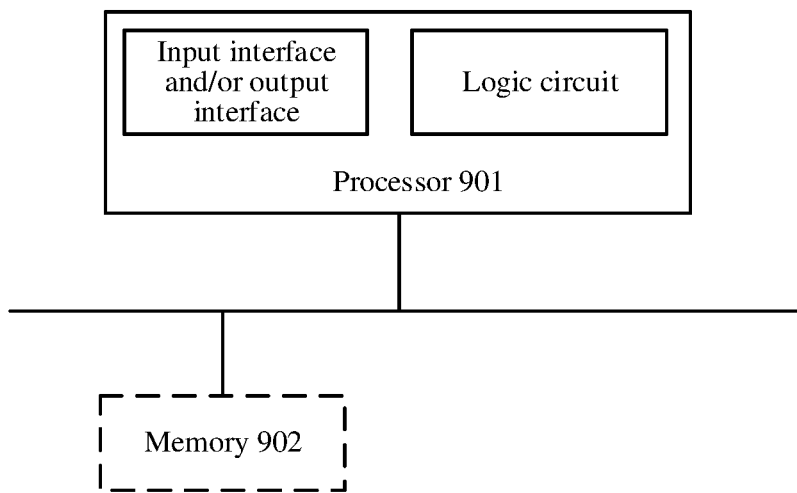
FIG. 10 is a schematic diagram of a hardware structure of still another communication apparatus.

An embodiment further provides a schematic diagram of a hardware structure of a communication apparatus. As shown in FIG. 9 or FIG. 10, the communication apparatus includes a processor 901. Optionally, the communication apparatus further includes a memory 902 connected to the processor 901.

The processor 901 may be a general-purpose central processing unit (CPU), a microprocessor, an application-specific integrated circuit (ASIC), or one or more integrated circuits configured to control program execution. The processor 901 may alternatively include a plurality of CPUs, and the processor 901 may be a single-core (single-CPU) processor or a multi-core (multi-CPU) processor. The processor herein may be one or more devices, circuits, or processing cores configured to process data (for example, computer computer-executable instructions).

The memory 902 may be a ROM or another type of static storage device that can store static information and computer-executable instructions, a RAM or another type of dynamic storage device that can store information and computer-executable instructions. The memory 902 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or a magnetic disk storage medium or another magnetic storage device, or any other medium that can be used to carry or store expected program code in a form of computer-executable instructions or a data structure and that is accessible by a computer. This is not limited in the embodiments. The memory 902 may independently exist (where in this case, the memory 902 may be located outside the communication apparatus, or may be located inside the communication apparatus), or may be integrated with the processor 901. The memory 902 may include computer program code. The processor 901 is configured to execute the computer program code stored in the memory 902, to implement the method provided in the embodiments. In a first possible implementation, refer to FIG. 9. The communication apparatus further includes a transceiver 903. The processor 901, the memory 902, and the transceiver 903 are connected through a bus. The transceiver 903 is configured to communicate with another device or a communication network. Optionally, the transceiver 903 may include a transmitter and a receiver. A component configured to implement a receiving function in the transceiver 903 may be considered as a receiver. The receiver is configured to perform a receiving step in the embodiments. A component configured to implement a sending function in the transceiver 903 may be considered as a transmitter. The transmitter is configured to perform a sending step in the embodiments. In the possible implementation, for example, the processor 901 may perform actions performed by the processing unit 801, the transceiver 903 may perform actions performed by the communication unit 802, and a function of the memory 902 may be the same as that of the storage unit 803.

Based on the first possible implementation, a schematic diagram of a structure shown in FIG. 9 may be used to show structures of the terminal and the network device in the foregoing embodiments.

When the schematic diagram of the structure shown in FIG. 9 is used to show a structure of the terminal in the foregoing embodiments, the processor 901 is configured to control and manage actions of the terminal. For example, the processor 901 is configured to perform 202, 203, 204, 207, 208, and 209 in FIG. 2, 301, 302, 304, 305, 307, and 308 in FIG. 3, 401, 402, 404, 405, 407, and 408 in FIG. 4, and 501, 502, 504, 505, 507, and 508 in FIG. 5, 601 to 604 in FIG. 6, 701 to 704 in FIG. 7, and/or actions performed by the terminal in another process described in the embodiments. The processor 901 may communicate with another network entity through the transceiver 903, for example, communicate with the network device in FIG. 2 (for example, receive first information from the network device, and send a pilot to the network device). The memory 902 is configured to store program code and data of the terminal.

When the schematic diagram of the structure shown in FIG. 9 is used to show a structure of the network device in the foregoing embodiments, the processor 901 is configured to control and manage actions of the network device. For example, the processor 901 is configured to perform 201, 202, 204, 205, 206, 207, 209, and 210 in FIG. 2, 301 to 308 in FIG. 3, 401 to 408 in FIG. 4, 501 to 508 in FIG. 5, 601 and 604 in FIG. 6, and 701 and 704 in FIG. 7, and/or actions performed by the network device in another process described in the embodiments. The processor 901 may communicate with another network entity through the transceiver 903, for example, communicate with the terminal in FIG. 2 (for example, send first information to the terminal, or receive a pilot from the terminal). The memory 902 is configured to store program code and data of the network device.

In a second possible implementation, the processor 901 includes a logic circuit, and an input interface and/or an output interface. For example, the output interface is configured to perform a sending action in a corresponding method, and the input interface is configured to perform a receiving action in the corresponding method. In the possible implementation, for example, the processor 901 may perform actions performed by the processing unit 801, the input interface and/or the output interface may perform actions performed by the communication unit 802, and a function of the memory 902 may be the same as that of the storage unit 803.

Based on the second possible implementation, refer to FIG. 10. A schematic diagram of a structure shown in FIG. 10 may be used to show structures of the terminal and the network device in the foregoing embodiments.

When the schematic diagram of the structure shown in FIG. 10 is used to show a structure of the terminal in the foregoing embodiments, the processor 901 is configured to control and manage actions of the terminal. For example, the processor 901 is configured to perform 202, 203, 204, 207, 208, and 209 in FIG. 2, 301, 302, 304, 305, 307, and 308 in FIG. 3, 401, 402, 404, 405, 407, and 408 in FIG. 4, and 501, 502, 504, 505, 507, and 508 in FIG. 5, 601 to 604 in FIG. 6, 701 to 704 in FIG. 7, and/or actions performed by the terminal in another process described in the embodiments. The processor 901 may communicate with another network entity through the input interface and/or the output interface, for example, communicate with the network device in FIG. 2 (for example, receive first information from the network device, and send a pilot to the network device). The memory 902 is configured to store program code and data of the terminal.

When the schematic diagram of the structure shown in FIG. 10 is used to show a structure of the network device in the foregoing embodiments, the processor 901 is configured to control and manage actions of the network device. For example, the processor 901 is configured to perform 201, 202, 204, 205, 206, 207, 209, and 210 in FIG. 2, 301 to 308 in FIG. 3, 401 to 408 in FIG. 4, 501 to 508 in FIG. 5, 601 and 604 in FIG. 6, and 701 and 704 in FIG. 7, and/or actions performed by the network device in another process described in the embodiments. The processor 901 may communicate with another network entity through the input interface and/or the output interface, for example, communicate with the terminal in FIG. 2 (for example, send first information to the terminal, or receive a pilot from the terminal). The memory 902 is configured to store program code and data of the network device.

In an implementation process, the steps in the method provided in this embodiment may be completed by using a hardware integrated logic circuit in the processor, or by using computer-executable instructions in a form of software. The steps of the method with reference to the embodiments may be directly performed by a hardware processor or may be performed by using a combination of hardware in the processor and a software module.

An embodiment further provides a non-transitory computer-readable storage medium, including computer-executable instructions. When the computer-executable instructions are run on a computer, any method in the foregoing embodiments is performed.

An embodiment further provides a computer program product including computer-executable instructions. When the computer program product is run on a computer, the computer is enabled to perform any method in the foregoing embodiments.

An embodiment further provides a computer program. When the computer program is run on a computer, any method in the foregoing embodiments is performed.

An embodiment further provides a communication system, including the terminal and the network device in the foregoing embodiments.

An embodiment further provides a chip, including a processor and an interface, where the processor is coupled to a memory through the interface, and when the processor executes computer-executable instructions in the memory, any method provided in the foregoing embodiments is performed.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer-executable instructions. When the computer-executable instructions are loaded and executed on the computer, the procedure or functions in the embodiments are all or partially generated. The computer may be a general-purpose computer, a dedicated computer, a computer network, or another programmable apparatus. The computer-executable instructions may be stored in a non-transitory computer-readable storage medium. The non-transitory computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state drive (SSD)), or the like. It should be noted that, the computer-executable instructions may also be referred to as computer programs, instructions, computer instructions, or the like.

Although described with reference to the embodiments, a person skilled in the art may understand and implement another variation of the embodiments by viewing the accompanying drawings and accompanying content,. A single processor or another unit may implement several functions enumerated in the embodiments. Some measures are recorded in embodiments that are different from each other, but this does not indicate that these measures cannot be combined to produce a better effect.

Although described with reference to the embodiments, various modifications and combinations may be made to them without departing from the scope of the embodiments. Correspondingly, the embodiments and accompanying drawings are merely examples, and is considered as any of or all modifications, variations, combinations or equivalents that cover the scope of the embodiments person skilled in the art can make various modifications and variations without departing from the scope of the embodiments and their equivalent technologies.

What is claimed is:

1. A pilot determining method, comprising:

receiving, by a first terminal, first information from a network device, wherein the first information is based on a joint matrix, the joint matrix includes transmit/receive full-dimensional statistical information of channels between $N_U$ terminals and the network device, the joint matrix is for determining pilots of the $N_U$ terminals, the first terminal is a terminal in the $N_U$ terminals, and $N_U$ is an integer greater than 0; and determining, by the first terminal based on the first information, a pilot used by the first terminal.

2. The pilot determining method according to claim 1, wherein the first information is a pilot corresponding to the first terminal in a first matrix, and the first matrix includes the pilots of the $N_U$ terminals.

3. The pilot determining method according to claim 1, wherein the first information is a parameter based on transforming and compressing a pilot corresponding to the first terminal in a first matrix, and the first matrix includes the pilots of the $N_U$ terminals; and determining the pilot further comprises:

obtaining, by the first terminal based on the first information, the pilot corresponding to the first terminal in the first matrix through restoration.

4. The pilot determining method according to claim 1, wherein the first information includes second information and an index of the first terminal, the second information is for determining the joint matrix, and the index of the first terminal is for determining the pilot used by the first terminal; and determining the pilot further comprises:

determining, by the first terminal based on the second information, the joint matrix;

determining, by the first terminal, a first matrix based on the joint matrix, wherein the first matrix includes the pilots of the $N_U$ terminals; and determining, by the first terminal based on the index of the first terminal, the pilot used by the first terminal from the first matrix.

5. The pilot determining method according to claim 4, wherein the second information is for indicating the transmit/receive full-dimensional statistical information corresponding to the $N_U$ terminals in the joint matrix; or the second information is for indicating Q transmit/receive angle spectral coefficients determined based on the joint matrix and indexes corresponding to the Q transmit/receive angle spectral coefficients; or the second information is for indicating $N_U$*P transmit/receive angle spectral coefficients determined based on the transmit/receive full-dimensional statistical information corresponding to the $N_U$ terminals and indexes corresponding to the $N_U$*P transmit/receive angle spectral coefficients, wherein each terminal in the $N_U$ terminals corresponds to P transmit/receive angle spectral coefficients and P indexes, and the P indexes corresponding to the first terminal are indexes corresponding to the P transmit/receive angle spectral coefficients corresponding to the first terminal, wherein both Q and P are integers greater than 0.

6. The pilot determining method according to claim 1, wherein when a second terminal in the $N_U$ terminals does not need to send the pilot to the network device, the method further comprises:

receiving, by the first terminal, an index of the second terminal from the network device;

deleting, by the first terminal based on the index of the second terminal, an element corresponding to the second terminal from the joint matrix, to obtain an updated joint matrix; and updating, by the first terminal, the first matrix based on the updated joint matrix.

7. The pilot determining method according to claim 1, wherein when a third terminal other than the $N_U$ terminals needs to send the pilot to the network device, the method further comprises:

receiving, by the first terminal, transmit/receive full-dimensional statistical information corresponding to the third terminal from the network device;

adding, by the first terminal, the transmit/receive full-dimensional statistical information corresponding to the third terminal to the joint matrix, to obtain an updated joint matrix; and updating, by the first terminal, the first matrix based on the updated joint matrix.

8. The pilot determining method according to claim 4, wherein determining the first matrix-further comprises:

obtaining, by the first terminal, a second matrix based on the joint matrix, wherein the second matrix includes transmit end components of the joint matrix; and determining, by the first terminal, the first matrix based on the second matrix.

9. The pilot determining method according to claim 8, wherein determining the first matrix-further comprises:

obtaining, by the first terminal, a third matrix based on the second matrix, wherein the third matrix includes direction information of the transmit end components of the joint matrix; and determining, by the first terminal, the first matrix based on the third matrix.

10. The pilot determining method according to claim 9, wherein determining the first matrix-further comprises:

determining, by the first terminal, that a matrix formed by eigenvectors of Np largest eigenvalues corresponding to the third matrix is the first matrix; or determining, by the first terminal, that a matrix based on performing terminal-level power normalization on a matrix formed by eigenvectors of Np largest eigenvalues corresponding to the third matrix is the first matrix, wherein Np is a quantity of resources for transmitting the pilots, and Np is an integer greater than 1.

11. The pilot determining method according to claim 8, wherein determining the first matrix further comprises:

obtaining, by the first terminal, a third matrix based on the second matrix, wherein the third matrix includes direction information of the transmit end components of the joint matrix;

obtaining, by the first terminal, a fourth matrix based on the second matrix, wherein the fourth matrix includes size information of the transmit end components of the joint matrix;

determining, by the first terminal, a fifth matrix based on the fourth matrix and a quantity of resources for transmitting the pilots, wherein the fifth matrix is used for power allocation of a transmit end component in each direction in the third matrix; and determining, by the first terminal, the first matrix based on the third matrix and the fifth matrix.

12. The pilot determining method according to claim 11, wherein determining the first matrix based on the third matrix and the fifth matrix further comprises:

multiplying, by the first terminal, the third matrix and the fifth matrix to obtain the first matrix; or determining, by the first terminal, that a matrix based on multiplying the third matrix and the fifth matrix and performing terminal-level power normalization is the first matrix.

13. The method according to claim 4, wherein determining a first matrix based on the joint matrix further comprises:

obtaining, by the first terminal, an initial first matrix based on the joint matrix; and using, by the first terminal, the initial first matrix as an initial solution, and obtaining the first matrix based on an iteration method; or using, by the first terminal, the initial first matrix as an initial solution, obtaining a sixth matrix based on an iteration method, and determining that a matrix based on performing terminal-level power normalization on the sixth matrix is the first matrix.

14. The pilot determining method according to claim 1, wherein the joint matrix is based on performing block-diagonal concatenation on $N_U$ pieces of transmit/receive full-dimensional statistical information, an $n_u^{th}$ piece of transmit/receive full-dimensional statistical information in the $N_U$ pieces of transmit/receive full-dimensional statistical information is transmit/receive full-dimensional statistical information of a channel between an $n_u^{th}$ terminal in the $N_U$ terminals and the network device, and $n_u$ is an integer greater than 0 and less than or equal to Nu.

15. The pilot determining method according to claim 14, wherein the $N_U$ pieces of transmit/receive full-dimensional statistical information are determined based on channel matrices of the $N_U$ terminals.

16. A pilot determining method, comprising:

obtaining, by a network device, a joint matrix, wherein the joint matrix includes transmit/receive full-dimensional statistical information of channels between $N_U$ terminals and the network device, the joint matrix is for determining pilots of the $N_U$ terminals, and $N_U$ is an integer greater than 0; and sending, by the network device, first information to a first terminal, wherein the first information is for determining a pilot used by the first terminal, the first information is determined based on the joint matrix, and the first terminal is a terminal in the $N_U$ terminals.

17. The pilot determining method according to claim 16, further comprising:

obtaining, by the network device, a first matrix based on the joint matrix, wherein the first matrix includes the pilots of the $N_U$ terminals; and determining, by the network device, the first information based on a pilot corresponding to the first terminal in the first matrix.

18. The pilot determining method according to claim 17, wherein the first information is a pilot corresponding to the first terminal in the first matrix, or the first information is a parameter based on transforming and compressing a pilot corresponding to the first terminal in the first matrix.

19. The pilot determining method according to claim 16, wherein the first information includes second information and an index of the first terminal, the second information is for determining the joint matrix, and the index of the first terminal is for determining the pilot used by the first terminal.

20. A communication apparatus, comprising: a processor, wherein the processor is connected to a memory, the memory is configured to store computer-executable instructions, and the processor executes the computer-executable instructions stored in the memory,-thereby causing the wireless communication apparatus to perform:

receiving, by a first terminal, first information from a network device, wherein the first information is based on a joint matrix, the joint matrix includes transmit/receive full-dimensional statistical information of channels between $N_U$ terminals and the network device, the joint matrix is for determining pilots of the $N_U$ terminals, the first terminal is a terminal in the $N_U$ terminals, and $N_U$ is an integer greater than 0; and determining, by the first terminal based on the first information, a pilot used by the first terminal.

* * * * *